(12) United States Patent
Osame

(10) Patent No.: US 7,430,888 B2
(45) Date of Patent: Oct. 7, 2008

(54) TUBULAR METAL BODY, METHOD OF PRODUCING SAME, LINER FOR PRESSURE VESSEL AND METHOD OF PRODUCING SAME

(75) Inventor: Yasuhiro Osame, Oyama (JP)

(73) Assignees: Showa Denko K.K., Tokyo (JP); Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 10/554,112

(22) PCT Filed: Apr. 22, 2004

(86) PCT No.: PCT/JP2004/005817

§ 371 (c)(1),
(2), (4) Date: Oct. 21, 2005

(87) PCT Pub. No.: WO2004/096459

PCT Pub. Date: Nov. 11, 2004

(65) Prior Publication Data

US 2006/0260376 A1    Nov. 23, 2006

Related U.S. Application Data

(60) Provisional application No. 60/469,002, filed on May 9, 2003, provisional application No. 60/469,023, filed on May 9, 2003.

(30) Foreign Application Priority Data

Apr. 25, 2003  (JP)  ............................ 2003-121286
Apr. 25, 2003  (JP)  ............................ 2003-121297

(51) Int. Cl.
    *B21C 23/00*    (2006.01)
(52) U.S. Cl. .......................... 72/256; 72/253.1; 72/269; 72/368

(58) Field of Classification Search ................ 72/67, 72/68, 112, 253.1, 256, 260, 264, 269, 342.1, 72/342.94, 368, 254, 257, 271; 228/112.1, 228/114
See application file for complete search history.

(56) References Cited

U.S. PATENT DOCUMENTS 3,575,030 A * 4/1971 Braeuninger ................. 72/269
6,581,819 B1 * 6/2003 Aota et al. ............... 228/112.1

(Continued)

FOREIGN PATENT DOCUMENTS

JP    56-165512    * 12/1981

(Continued)

*Primary Examiner*—Edward Tolan
(74) *Attorney, Agent, or Firm*—Oblon, Spivak, McClelland, Maier & Neustadt, P.C.

(57) ABSTRACT

A tubular metal body 1 comprises a tube 2 extruded through a porthole die and composed of a plurality of components 2b joined to one another with a plurality of joint portions 2a extending over the entire length of the tube. The base material metal of the extruded tube 2 in each of the joint portions 2a is subjected to a modifying treatment to produce finely divided crystal grains. The modifying treatment for the extruded tube 2 is conducted preferably by frictionally agitating each joint portion using a probe 8 of a friction agitation joining tool 6. The tubular metal body 1 is available with an increased length in a larger size and has high pressure resistance.

4 Claims, 15 Drawing Sheets

U.S. PATENT DOCUMENTS

| | | | |
|---|---|---|---|
| 6,660,106 B1 * | 12/2003 | Babel et al. | 148/527 |
| 6,681,610 B2 * | 1/2004 | Yanagibashi et al. | 72/260 |
| 6,726,085 B2 * | 4/2004 | Litwinski et al. | 228/112.1 |
| 6,892,928 B2 * | 5/2005 | Tanaka et al. | 228/114 |
| 7,131,567 B2 * | 11/2006 | Grong | 228/164 |
| 7,225,967 B2 * | 6/2007 | Slattery | 228/112.1 |

FOREIGN PATENT DOCUMENTS

| | | |
|---|---|---|
| JP | 7-243588 | 9/1995 |
| JP | 10-160097 | 6/1998 |
| JP | 11-172387 | 6/1999 |
| JP | 2001-32058 | 2/2001 |
| JP | 2003-13191 | 1/2003 |
| JP | 2003-64458 | 3/2003 |

\* cited by examiner

TUBULAR METAL BODY, METHOD OF PRODUCING SAME, LINER FOR PRESSURE VESSEL AND METHOD OF PRODUCING SAME

CROSS REFERENCE TO RELATED APPLICATIONS

This application is an application filed under 35 U.S.C. §111(a) claiming the benefit pursuant to 35 U.S.C. §119(e)(1) of the filing date of Provisional Applications No. 60/469,002 and No. 60/469,023 each filed May 9, 2003 pursuant to 35 U.S.C. §111(b).

TECHNICAL FIELD

The present invention relates to tubular metal bodies for use in high-pressure piping, for example, for motor vehicles, houses, transport machines, etc. for passing therethrough fuel hydrogen gas or natural gas of high pressure serving as a fuel for power generation and to a method of producing the same.

The present invention relates also to liners for use in pressure vessels for storing hydrogen gas or natural gas serving as a fuel for power generation, for example, in motor vehicles, houses, transport machines, etc. or for use in pressure vessels for storing oxygen gas in oxygen gas supply systems and to a method of producing the liner.

BACKGROUND ART

Widely used as tubular metal bodies are electro-resistance-welded tubes which are made by forming a metal sheet into a tubular form by roll forming and joining portions thereof butted against each other by high-frequency welding.

Since the weld of the electro-resistance welded tube has a reduced strength by being thermally affected, the weld is susceptible to fatigue fracture due to stress concentration. The use of electro-resistance-welded tubes in pressure piping systems for passing a high-pressure gas has not been approved presently.

Accordingly, tubes extruded with use of a mandrel (hereinafter referred to as "mandrel-extruded tubes") or tubes extruded through a porthole die (hereinafter referred to as "porthole die-extruded tubes" or "die-extruded tubes") appear useful for pressure piping systems.

However, mandrel-extruded tubes are likely to have an uneven wall thickness and moreover have the problem that these tubes are not available with a large diameter and/or in a large length. Another problem encountered is that they can not be obtained if having a complex cross sectional shape. These problems may be overcome with porthole die-extruded tubes, whereas these tubes have the following problem. The die-extruded tube is produced by temporarily separating a flow of metal material from a billet into portions at the port part of a porthole die and joining the separated metal material again at the chamber part. The tube comprises a plurality of components as joined to one another with a plurality of joint portions extending over the entire length of the tube. Since the joint portions are inferior to the tube components in mechanical properties such as strength and elongation, the tube is likely to fracture at the joint portion owing to stress concentration when used in pressure piping.

It is thought that the die-extruded tube can be made usable for pressure piping systems when the joint portions are modified in properties. Various heat treatments are known for the billets to be used for extrusion in order to improve the corrosion resistance of the joint portions of porthole die-extruded tubes (see the publication of JP-A No. 1999-172387).

However, methods of improving the mechanical properties of the joint portions still remain to be developed, and die-extruded tubes have not been placed into use for pressure piping systems.

On the other hand, the high-pressure gas to be contained in pressure vessels like those above-mentioned generally has pressure of about 20 to about 35 MPa at present, whereas the pressure will presumably be raised to about 70 MPa in the future.

A liner already known for use in such pressure vessels is produced from a cuplike blank of aluminum by ironing the body of the blank axially thereof by flow forming to make a headplate portion at each of opposite ends of a hollow cylindrical trunk, closing at least one of the head plate portions to give a larger wall thickness to the head plate portion than the trunk and forming a mouthpiece mount bore in a closure portion provided centrally of the head plate portion (see the publication of JP-A No. 1999-104762, claim 1).

However, this pressure vessel liner has the problem of necessitating a cumbersome machining operation and failing to have an increased length and a larger size.

Also known is a liner for pressure vessels which comprises an extruded tubular body of aluminum and head plates welded to respective opposite ends of the body (see the publication of JP-A No. 1999-104762, FIG. 7). Useful as the extruded tubular aluminum body is a mandrel-extruded tube, porthole die-extruded tube, or the like.

The mandrel-extruded tube or die-extruded tube nevertheless has the problem described with reference to the pressure piping, and the die-extruded tube has not been placed into use as the trunk of the liner for pressure vessels.

An object of the present invention, which has been accomplished in view of the foregoing situation, is to provide a tubular metal body which can be of increased length and greater size and which has outstanding pressure resistance, and a method of producing the same.

Another object of the invention is to provide a pressure vessel liner which can be of increased length and greater size and which has outstanding pressure resistance, and a method of producing the same.

SUMMARY OF THE INVENTION

The present invention provides a tubular metal body comprising a tube extruded through a porthole die and composed of a plurality of components joined to one another with a plurality of joint portions extending over the entire length of the tube, the base material metal of the extruded tube in each of the joint portions being subjected to a modifying treatment to produce finely divided crystal grains.

Thus, the tubular metal body of the present invention comprises a porthole die-extruded tube composed of a plurality of components joined to one another with joint portions extending over the entire length of the tube. The metal of the tube as the base material thereof in each of the joint portions is subjected to a modifying treatment to produce finely divided crystal grains. Accordingly, the joint portions are improved in mechanical properties, such as strength and elongation, and in corrosion resistance, giving the tubular metal body high pressure resistance. Even if the metal body is used as a pressure tube, for example, in pressure piping for passing a high-pressure gas therethrough, the joint portions are prevented from fracturing. The tubular metal body is uniform in wall thickness and can be given an increased length or a greater size. Furthermore, the tubular body can be of complex cross sectional shape.

With the tubular metal body of the invention, the modifying treatment for the extruded tube is conducted preferably by frictionally agitating each joint portion using a probe of a friction agitation joining tool.

With the tubular metal body of the invention, it is desired that the extruded tube be fixedly provided inside thereof with a reinforcing partition extending longitudinally of the tube so as to divide inside of the extruded tube into a plurality of spaces. The reinforcing partition is joined to the extruded tube by friction agitation at at least two joint portions, or is provided integrally with the components of the extruded tube. When the tube fixedly has the reinforcing partition provided therein and extending longitudinally thereof so as to divide the interior thereof into a plurality of spaces, the tubular metal body is given further improved pressure resistance.

The present invention provides a method of producing a tubular metal body characterized by preparing a tube extruded through a porthole die and comprising a plurality of components joined to one another with a plurality of joint portions extending over the entire length of the tube, placing a probe of a friction agitation joining tool from outside into each of the joint portions of the extruded tube so as to position the probe partly in the tube components on opposite sides of the joint portion, and thereafter moving the extruded tube and the probe relative to each other longitudinally of the tube to thereby frictionally agitate the base material metal of the extruded tube for a modifying treatment to produce finely divided crystal grains.

The tubular metal body can be produced relatively easily by the method of the invention.

In the tubular metal body production method of the invention, it is desired that the base material metal of the tube as extruded from an extruder be frictionally agitated in the joint portions immediately after extrusion. The tubular metal body can then be produced at a higher rate to achieve a higher production efficiency than when a porthole die-extruded tube having its temperature lowered to a cold working level is used. The reason is that in the case where the base material metal of the die-extruded tube having its temperature lowered to a cold working level is frictionally agitated, it takes time for the frictional heat generated by the rotation of the probe to soften the tube at the joint portion and in the vicinity thereof. Further when the base material metal of the tube as extruded from the extruder is frictionally agitated immediately after extrusion, it becomes possible to subject the tubular metal body produced to a uniform solution heat treatment to result in stabilized mechanical properties. In the case where the base material metal of the die-extruded tube as cooled to the cold working temperature is frictionally agitated, the temperature of the tube rises locally at the joint portion and in the vicinity thereof to entail the likelihood that the tubular body produced will be subjected to an uneven solution heat treatment. Additionally in the case where the base material metal of the tube as extruded from the extruder is frictionally agitated immediately after extrusion, this operation eliminates a faulty joint that would be produced between the components of the tube in the initial stage of extrusion.

With the tubular metal body production method of the invention, the extruded tube may have a reinforcing partition placed therein and extending longitudinally of the tube so as to divide inside thereof into a plurality of spaces. In frictionally agitating the base material metal of the extruded tube in each of the joint portions thereof, the forward end of the probe is then placed into the partition through each of at least two of the joint portions to join the partition to the extruded tube by friction agitation. The extruded tube may have a reinforcing partition interconnecting at least two of the components thereof and extending longitudinally of the tube. The reinforcing partition is then extruded integrally with the tube.

The present invention provides a first liner for pressure vessels which comprises a trunk having an opening at each of opposite ends thereof, and a head plate joined to each of the opposite ends of the trunk and closing the end opening of the trunk, the trunk comprising the extruded tube having the modified joint portions and constituting the tubular metal body of the invention.

The invention provides a second liner for pressure vessels which comprises a trunk having an opening at each of opposite ends thereof, a head plate portion integral with one end of the trunk for closing the end opening of the trunk and having a mouthpiece mount portion, and a head plate joined to the other end of the trunk and closing the other end opening of the trunk, the trunk and the head plate portion being provided by machining one end portion of the extruded tube having the modified joint portions and constituting the tubular metal body of the invention.

With each of the first and second liners for use in pressure vessels, high pressure resistance is given to the trunk and accordingly to the entire liner, and the liner is prevented from fracturing at the joint portions. The trunk is made from a die-extruded tube, is therefore uniform in wall thickness and affords a liner of increased length or larger size. Furthermore, liners of complex cross section can be provided.

With the two liners of the invention for use in pressure vessels, the head plate may be joined to the trunk by friction agitation.

With the two pressure vessel liners of the invention, the trunk is fixedly provided inside thereof with a reinforcing partition extending longitudinally of the trunk and dividing inside of the trunk into a plurality of spaces. The reinforcing partition is joined to the trunk by friction agitation at at least two of the modified joint portions of the extruded tube constituting the trunk, or is extruded integrally with the components of the extruded tube constituting the trunk. When the trunk is fixedly provided inside thereof with a reinforcing partition extending longitudinally of the trunk and dividing inside of the trunk into a plurality of spaces, further improved pressure resistance can be given to the trunk, accordingly to the entire pressure vessel liner.

With the pressure vessel liner wherein the trunk fixedly has the reinforcing partition therein, the partition preferably has an end portion positioned toward the trunk end to which the head plate is to be joined and projecting outward from the trunk, and the head plate is fitted around the projecting portion and joined to the trunk. Since the trunk and the head plate are supported by the partition from inside in this case, the parts can be joined with an improved work efficiency while the trunk and the head plate can be prevented from deforming inward when the parts are joined by friction agitation.

The present invention provides a third liner for pressure vessels which comprises a trunk having an opening at each of opposite ends thereof and two head plate portions formed integrally with respective opposite ends of the trunk for closing the end openings and each having a mouthpiece mount portion, the trunk and the two head plate portions being provided by machining opposite end portions of the extruded tube having the modified joint portions and constituting the tubular metal body of the invention.

With the third pressure vessel liner of the invention, high pressure resistance is given to the trunk and accordingly to the entire liner, and the liner is prevented from fracturing at the joint portions. The trunk is made from a die-extruded tube, is therefore uniform in wall thickness and affords a liner of increased length or larger size. Furthermore, liners of complex cross section can be provided.

With the first to third pressure vessel liners of the invention, the joint portions of the extruded tube constituting the trunk are modified preferably by frictionally agitating each of the joint portions with a probe of a friction agitation joining tool.

The present invention provides a fuel cell system comprising a fuel hydrogen gas pressure vessel, a fuel cell and pressure piping for transporting fuel hydrogen gas from the pressure vessel to the fuel cell therethrough, the pressure vessel having one of the first to third liners described.

The invention provides a natural gas supply system comprising a natural gas pressure vessel, and pressure piping for delivering natural gas from the pressure vessel, the pressure vessel having one of the first to third liners described.

The present invention provides a first method of producing a liner for pressure vessels characterized by preparing a tube extruded through a porthole die and comprising a plurality of components joined to one another with a plurality of joint portions extending over the entire length of the tube, placing a probe of a friction agitation joining tool from outside into each of the joint portions of the extruded tube so as to position the probe partly in the tube components on opposite sides of the joint portion, thereafter moving the extruded tube and the probe relative to each other longitudinally of the tube to thereby frictionally agitate the base material metal of the extruded tube for a modifying treatment to produce finely divided crystal grains and obtain a trunk having an opening at each of opposite ends thereof, and subsequently joining a head plate to each end of the trunk.

The present invention provides a second method of producing a liner for pressure vessels characterized by preparing a tube extruded through a porthole die and comprising a plurality of components joined to one another with a plurality of joint portions extending over the entire length of the tube, placing a probe of a friction agitation joining tool from outside into each of the joint portions of the extruded tube so as to position the probe partly in the tube components on opposite sides of the joint portion, thereafter moving the extruded tube and the probe relative to each other longitudinally of the tube to thereby frictionally agitate the base material metal of the extruded tube for a modifying treatment to produce finely divided crystal grains and obtain a trunk having an opening at each of opposite ends thereof, subsequently forming a head plate portion having a mouthpiece mount portion at one end portion of the trunk integrally therewith and further joining a head plate to the other end portion of the trunk.

The first and second pressure vessel liners can be produced relatively easily respectively by the first and second production methods of the invention.

In the first and second liner production methods of the invention, it is desired that the base material metal of the tube as extruded from an extruder be frictionally agitated in each joint portion immediately after extrusion. As in the case of the method of producing the tubular metal body described, the liner can then be produced at a higher rate to achieve a higher production efficiency than when a porthole die-extruded tube having its temperature lowered to a cold working level is used. Furthermore, it becomes possible to subject the liner produced to a uniform solution heat treatment to result in stabilized mechanical properties. The operation described eliminates a faulty joint that would be produced between the components of the tube in the initial stage of extrusion.

In the first and second liner production methods of the invention, the extruded tube may have a reinforcing partition placed therein and extending longitudinally of the tube so as to divide inside thereof into a plurality of spaces. In frictionally agitating the base material metal of the extruded tube in each of the joint portions thereof, the forward end of the probe is placed into the partition through each of at least two of the joint portions to join the partition to the extruded tube by friction agitation and to form the trunk and fix the partition to the trunk at the same time. This method then gives further improved pressure resistance to the trunk, and accordingly to the entire pressure vessel liner.

In the method of forming the trunk and fixing the reinforcing partition to the trunk at the same time, the reinforcing partition has an end portion positioned toward the trunk end portion to which the head plate is to be joined and projecting outward from the trunk, and the head plate is fitted around the projecting portion and joined to the trunk. Since the trunk and the head plate are supported by the partition from inside in this case, the parts can be joined with an improved work efficiency while the trunk and the head plate can be prevented from deforming inward, for example, when the parts are joined by friction agitation.

In the first and second liner production methods of the invention, the extruded tube may have a reinforcing partition interconnecting at least two of the components thereof and extending longitudinally of the tube. The reinforcing partition is then extruded integrally with the tube. The method gives further improved pressure resistance to the trunk, and accordingly to the entire liner.

In the method of extruding the tube and the reinforcing partition therein integrally therewith, the trunk end portion to which the head plate is to be joined is cut off to cause the reinforcing partition to project outward from the trunk, and the head plate is fitted around the projecting portion and joined to the trunk. Since the trunk and the head plate are supported by the partition from inside also in this case, the parts can be joined with an improved work efficiency while the trunk and the head plate can be prevented from deforming inward, for example, when the parts are joined by friction agitation.

In the first and second liner production methods of the invention, the head plate is butted against the trunk end portion to which the head plate is to be joined, a probe of a friction agitation joining tool is then placed into the butted portion of the trunk and the head plate to position the probe partly in the trunk and the head plate, and the trunk and the head plate are thereafter moved relative to the probe to move the probe along the butted portion over the entire circumference thereof and join the head plate to the trunk by friction agitation.

The present invention provides a method of producing a liner for pressure vessels characterized by preparing a tube extruded through a porthole die and comprising a plurality of components joined to one another with a plurality of joint portions extending over the entire length of the tube, placing a probe of a friction agitation joining tool from outside into each of the joint portions of the extruded tube so as to position the probe partly in the tube components on opposite sides of the joint portion, thereafter moving the extruded tube and the probe relative to each other longitudinally of the tube to thereby frictionally agitate the base material metal of the extruded tube for a modifying treatment to produce finely divided crystal grains and obtain a trunk having an opening at each of opposite ends thereof, and subsequently forming a head plate portion having a mouthpiece mount portion at each of opposite end portions of the trunk integrally therewith.

The third pressure vessel liner described can be produced relatively easily by the third production method of the invention.

BEST MODE OF CARRYING OUT THE INVENTION

Figure 1:
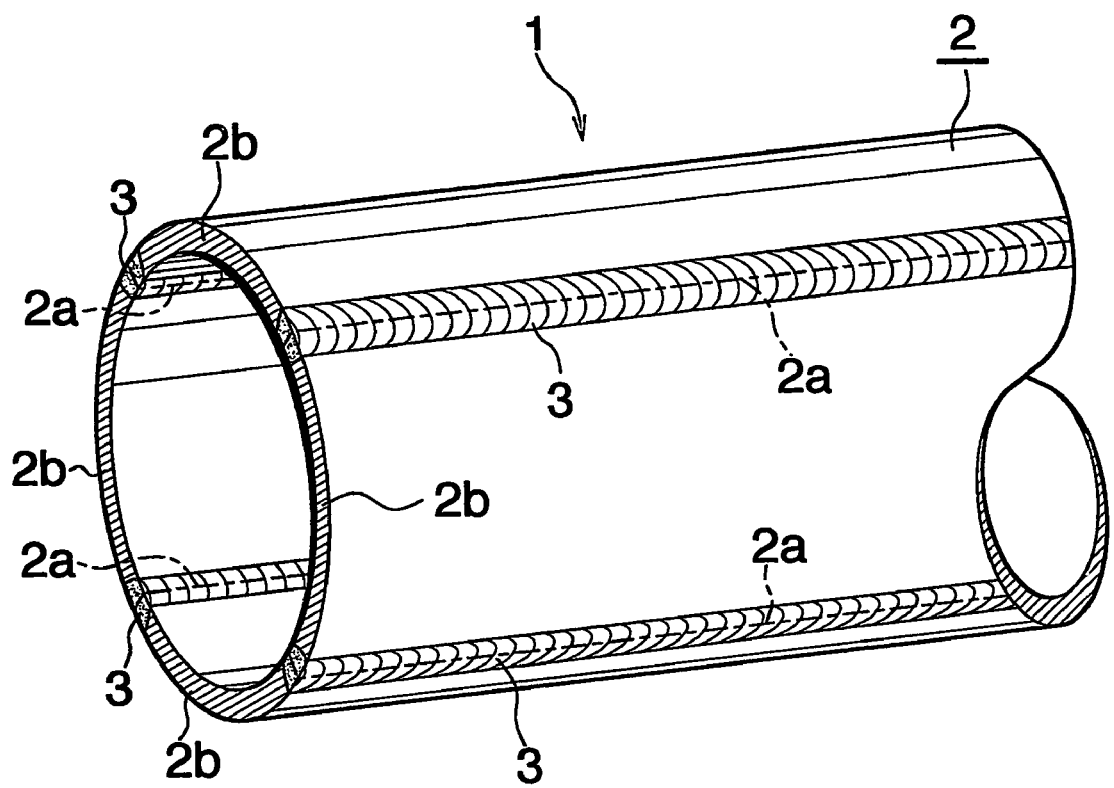
FIG. 1 is a fragmentary perspective view showing a tubular metal body according to Embodiment 1 of the invention.

Embodiments of the present invention will be described below with reference to the drawings. Throughout the drawings, like parts will be designated by like reference numerals and will not be described repeatedly.

In the following description, the term "aluminum" includes aluminum alloys in addition to pure aluminum.

Embodiment 1

Figure 2:
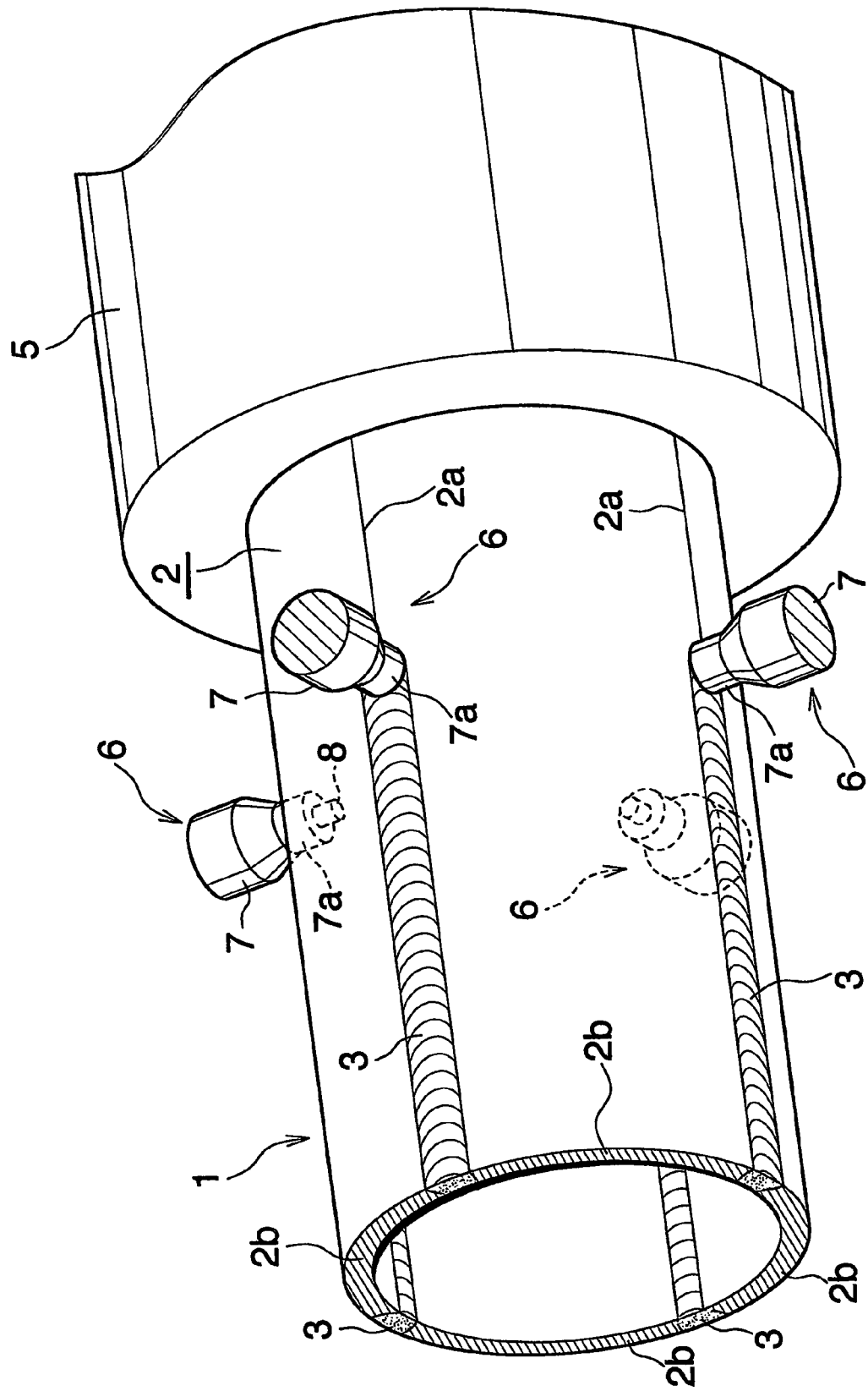
FIG. 2 is a fragmentary perspective view showing a method of producing the tubular metal body of Embodiment 1.
Figure 3:
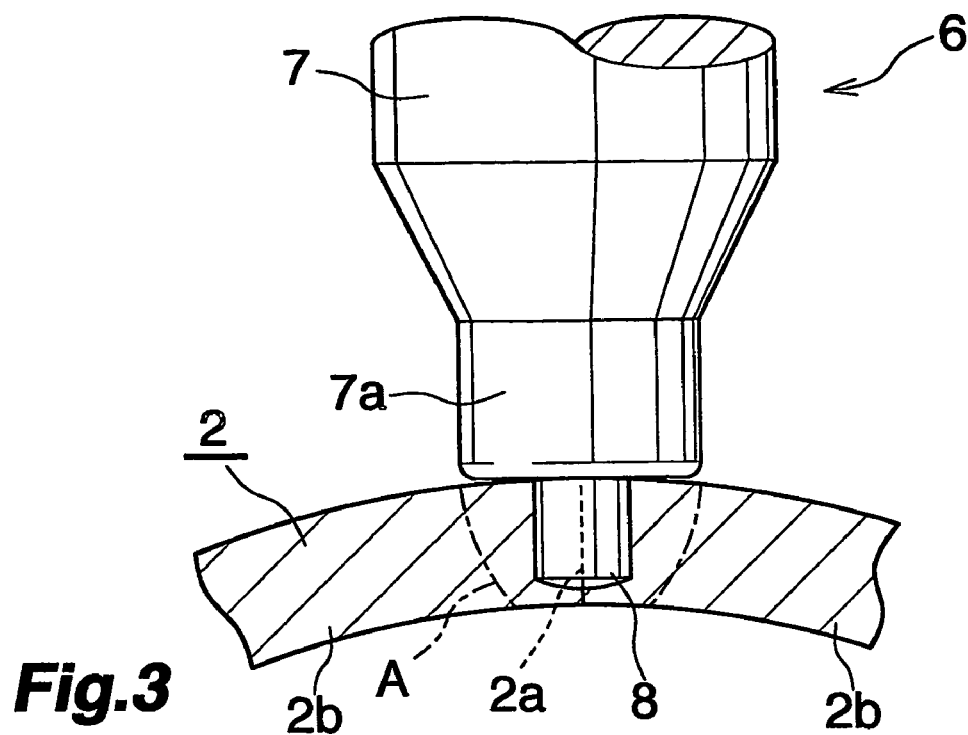
FIG. 3 is an enlarged fragmentary sectional view showing the method of producing the tubular metal body of Embodiment 1.

This embodiment is shown in FIGS. 1 to 3.

FIG. 1 shows a tubular metal body according to Embodiment 1, and FIGS. 2 and 3 show a method of producing the same.

With reference FIG. 1, the tubular metal body 1 comprises a porthole die-extruded tube 2 having a circular cross section and comprising a plurality of, more specifically four, components 2b which are joined to one another with a plurality of, i.e., four, joint portions 2a extending over the entire length of the tube. The metal serving as the base material of the extruded tube 2 is subjected to a modifying treatment at each of the joint portions 2a to produce finely divided crystal grains in a striplike portion having a specified width and including the joint portion 2a. The modified portion is indicated at 3.

The die-extruded tube 2 is made, for example, from one of JIS A2000 alloy, JIS A5000 alloy, JIS A6000 alloy and JIS A7000 alloy.

The base material is modified by friction agitation using a probe of friction agitation joining tool.

Incidentally, the cross sectional shape of the die-extruded tube 2 is not limited to circular but may be in the form of an ellipse (not limited to a mathematically defined elliptical form but including forms which are nearly elliptical, e.g., oblong) or otherwise shaped.

The tubular metal body 1 is produced by the method to be described below with reference to FIGS. 2 and 3.

First, an extruder 5 equipped with a porthole die is used for extruding a tube 2 comprising a plurality of components 2a which are joined to one another with a plurality of joint portions 2a extending over the entire length of the tube. Arranged outside the outlet of the extruder 5 are friction agitation joining tools 6 which are equal in number to the number of joint portions 2a of the tube 2 to be extruded and positioned in corresponding relation with the joint portions 2a. Each of the tools 6 comprises a solid cylindrical rotor 7 having a small-diameter portion 7a provided integrally therewith at a forward end thereof and extending from the rotor axially thereof with a tapered portion provided therebetween, and a pinlike probe 8 extending from the end of the rotor small-diameter portion 7a axially thereof and integrally therewith and having a smaller diameter than the portion 7a (see FIG. 3). The rotor 7 and the probe 8 are made of a material harder than the die-extruded tube 2 and having heat resistance to withstand the frictional heat to be produced during joining.

With the extrusion of the tube 2 temporarily stopped, each of the friction agitation joining tools 6 has its probe 8 placed from outside into an end portion of the corresponding joint portion 2a of the tube 2 as forced out of the extruder 5 immediately after extrusion so as to be positioned partly in the tube components 2b at opposite sides of the joint portion 2a while rotating the tool 6, with the shoulder of the small-diameter portion 7a of the tool 6 around the probe 8 pressed against the outer peripheral surface of the die-extruded tube 2 (see FIG. 3). At this time, the forward end of the probe 8 is positioned preferably at a distance of at least 0.1 mm to not greater than ½ of the wall thickness of the tube 2, from the inner periphery of the tube 2. If this distance is less than 0.1 mm, it is likely that a V-shaped groove will be formed in the inner periphery of the tube 2 longitudinally thereof during the agitation mixing operation by the probe 8 to be described later, and the tube 2 will not be satisfactory in pressure resistance. Alternatively if the distance is in excess of ½ of the tube wall thickness, the portion to be modified of the entire wall thickness of the tube is small in thickness to entail the likelihood that sufficient pressure resistance will not be available because the strength, elongation and like mechanical properties of the joint portion 2a can not be fully improved. The tube 2 as extruded from the extruder 5 immediately after extrusion retains the hot working temperature. The shoulder of the small-diameter portion 7a in pressing contact with the tube outer periphery ensures satisfactory agitation by preventing the soft metal portion from scattering at the start of and during the agitation to be described below, further generating frictional heat by the sliding movement of the shoulder on the tube 2 and softening the portion of the tube 2 in contact with the probe 8 and the vicinity of this portion to a greater extent while preventing formation of flashes or like irregularities on the outer periphery of the tube 2.

The extrusion of the tube 2 is then resumed to move the extruded tube 2 and each friction agitation joining tool 6 relative to each other and thereby move the probe 8 along the joint portion 2*a* longitudinally of the tube 2. The frictional heat generated by the rotation of the probe 8 and the frictional heat generated by the sliding movement of the extruded tube 2 and the shoulder relative to each other soften the base material metal of the tube 2 in the joint portion 2*a* and in the vicinity thereof (i.e., the region indicated by a chain line A in FIG. 3), and the softened portion is agitated and mixed by being subjected to the rotational force of the probe 8, further plastically flows to fill up a groove left by the passage of the probe 8 and thereafter rapidly loses the frictional heat to solidify on cooling. These phenomena are repeated with the movement of the probe 8 to frictionally agitate, mix and modify the base material metal in the joint portion 2*a* and the vicinity thereof, producing finely divided crystal grains. In this way, a tubular metal body 1 is continuously produced.

The tubular metal body 1 described is produced by continuously extruding the tube 2 and cutting the tube into specified lengths. The tubular metal body 1 produced last has bores formed at the position where the probes 8 are withdrawn, so that the portion having these bores is cut off. In producing the last metal body 1, a contact member is disposed at the end face of the tube 2 as completely forced out of the extruder in the position corresponding to the join portions 2*a*, and the probes 8 are removed after being brought to the location of the contact member. This eliminates the bores to be produced in the metal tube 1 by withdrawing the probes 8.

According to Embodiment 1, the probes 8 of friction agitation joining tools 6 are used for modifying the joint portions 2*a* of the die-extruded tube 2 immediately after extrusion while the tube retains the hot working temperature. However, this mode of modifying treatment is not limitative; the joint portions 2*a* of the die-extruded tube 2 may be modified after the tube has been extruded and spontaneously cooled subsequently.

Embodiment 2

Figure 6:
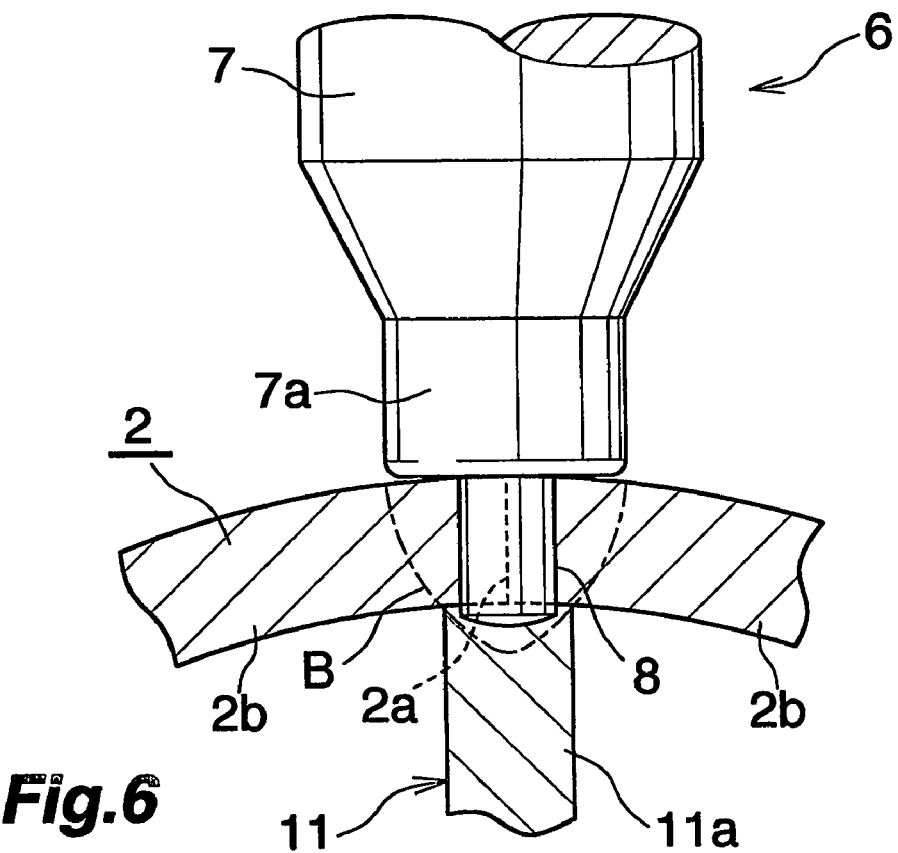
FIG. 6 is an enlarged fragmentary sectional view showing the method of producing the tubular metal body of Embodiment 2.
Figure 4:
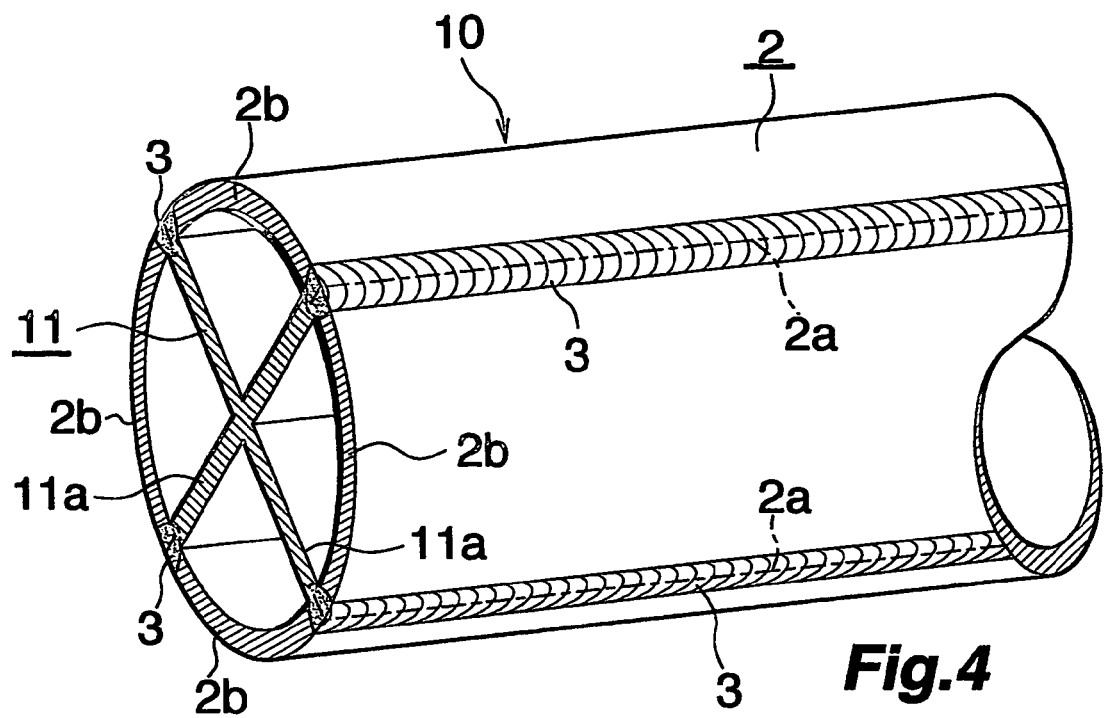
FIG. 4 is a fragmentary perspective view showing a tubular metal body according to Embodiment 2 of the invention.
Figure 5:
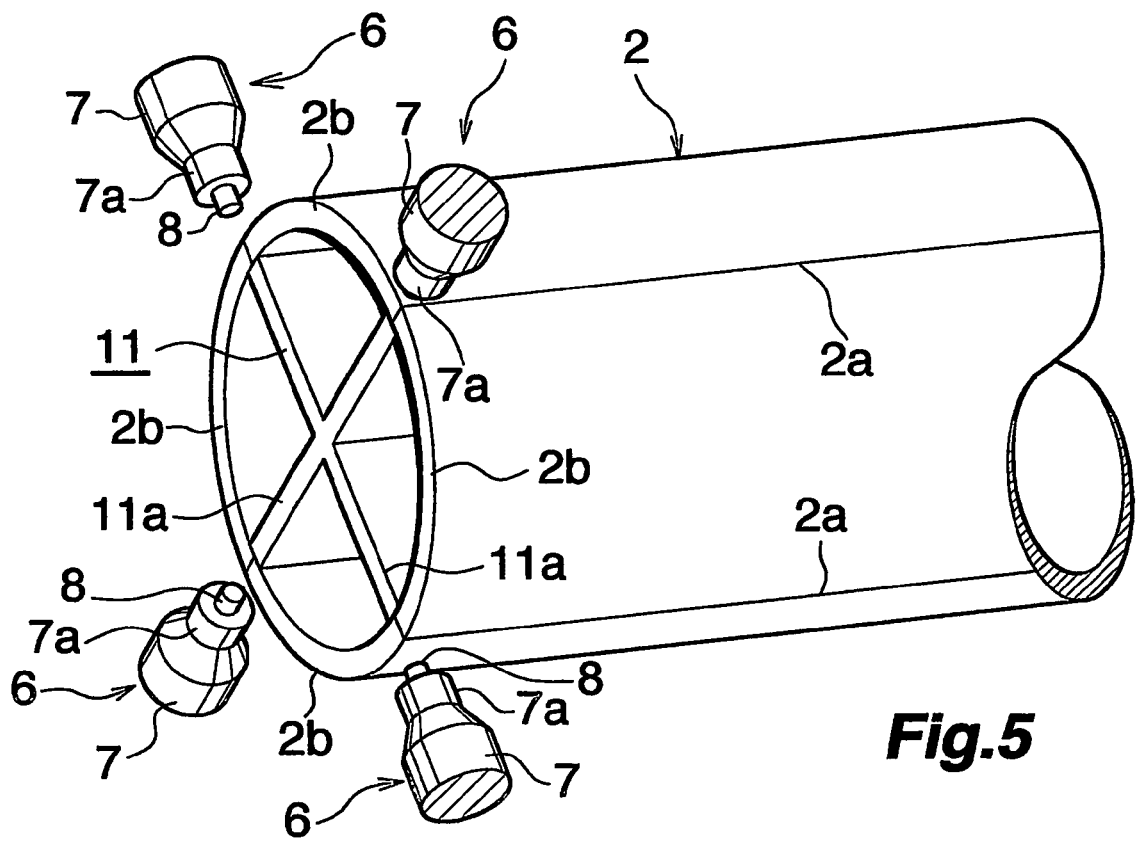
FIG. 5 is a fragmentary perspective view showing a method of producing the tubular metal body of Embodiment 2.

This embodiment is shown in FIGS. 4 to 6.

FIG. 4 shows a tubular metal body according to Embodiment 2, and FIGS. 5 and 6 show a method of producing the tubular metal body.

With reference to FIG. 4, the tubular metal body 10 comprises a porthole die-extruded tube 2 which is fixedly provided inside thereof with a reinforcing partition 11 extending over the entire length thereof and dividing the interior of the body 10 into a plurality of spaces. The tube 2 and the partition 11 have the same length and have their corresponding ends at the same position. The reinforcing partition 11 comprises four integral partition walls 11*a* extending radially from the center line of the tube 2 and equal in number to the number of joint portions 2*a*, and is in the form of a cross in cross section. Each of the partition walls 11*a* has an outer end joined by friction agitation to the tube 2 at the joint portion 2*a*. The reinforcing partition 11 is made, for example, from one of JIS A2000 alloy, JIS A5000 alloy, JIS A6000 alloy and JIS A7000 alloy.

The die-extruded tube 2 and the reinforcing partition 11 may be made from the same material or different materials.

The partition 11 shown in FIG. 4 comprises partition walls 11*a* which are equal in number to the number of joint portions 2*a* of the tube 2 and which are joined to the tube 2 at all the joint portions 2*a*, whereas the partition is not limited to this structure. The number of partition walls 11*a* may be smaller than that of joint portions 2*a* insofar as the interior of the tube 2 can be divided into a plurality of spaces by the walls. In this case, the partition walls 11*a* are joined to the tube 2 at the joint portions 2*a* which are positioned as opposed to the walls 11*a* and which are included among all the joint portions 2*a*.

The tubular metal body 10 is the same as the metal body 1 of Embodiment 1 with the exception of the above feature.

The tubular metal body 10 is produced by the method to be described next with reference to FIGS. 5 and 6.

First, a porthole die is used for extruding a tube 2 which comprises a plurality of components 2*b* joined to one another with a plurality of joint portions 2*a* extending over the entire length of the tube. The tube 2 is cut into specified lengths. A reinforcing partition 11 is also extruded and cut into the same lengths as the tube 2.

The cut partition 11 is inserted into the cut extruded tube 2, with the outer ends of the partition walls 11*a* positioned in register with the respective joint portions 2*a* (see FIG. 5). At this time, the outer ends of the partition walls 11*a* are brought into intimate contact with the inner peripheral surface of the extruded tube 2.

Subsequently, while rotating friction agitation joining tools 6, each of the tools 6 has its probe 8 placed from outside into an end portion of the corresponding joint portion 2*a* of the tube 2 so as to be positioned partly in the tube components 2*b* at opposite sides of the joint portion 2*a*, with the shoulder of the small-diameter portion 7*a* of the tool 6 around the probe 8 pressed against the outer peripheral surface of the die-extruded tube 2. At this time, the probe 8 is placed into the joint portion 2*a* so that the probe end is brought into the partition wall 11*a* of the reinforcing partition 11 (see FIG. 6). The shoulder pressed against the outer peripheral surface of the tube 2 produces the same effect as previously described with reference to Embodiment 1.

The extruded tube 2 and each friction agitation joining tool 6 are then moved relative to each other to thereby move the probe 8 along the joint portion 2*a* longitudinally of the tube 2, whereby the base material metal is frictionally agitated, mixed and modified in the joint portion 2*a* of the tube 2 and the vicinity thereof (i.e., in the region indicated by a chain line B in FIG. 6) to produce finely divided crystal grains as is the case with Embodiment 1. At the same time, the base material metal is softened at the outer end of the partition wall 11*a* (i.e., in the region indicated by the chain line B in FIG. 6) with the frictional heat generated by the rotation of the probe 8, and the softened portion is agitated and mixed by being subjected to the rotational force of the probe 8, further plastically flows to fill up a groove left by the passage of the probe 8 and thereafter rapidly loses the frictional heat to solidify on cooling. These phenomena are repeated with the movement of the probe 8 to join the tube 2 to the partition wall 11*a*. In this way, a tubular metal body 10 is continuously produced.

In producing the tubular metal body 10, the bore to be formed in the body by withdrawing the probe 8 can be eliminated by arranging contact members at opposite end faces of the tube 2 at positions corresponding to the joint portion 2*a*, placing the probe 8 into one of the contact members to modify the joint portion 2*a* and join the partition wall 11*a*, thereafter moving the probe 8 to the location of the other contact member, and withdrawing the probe. The contact members for the probe 8 to be placed in is not always necessary.

Embodiment 3

Figure 7:
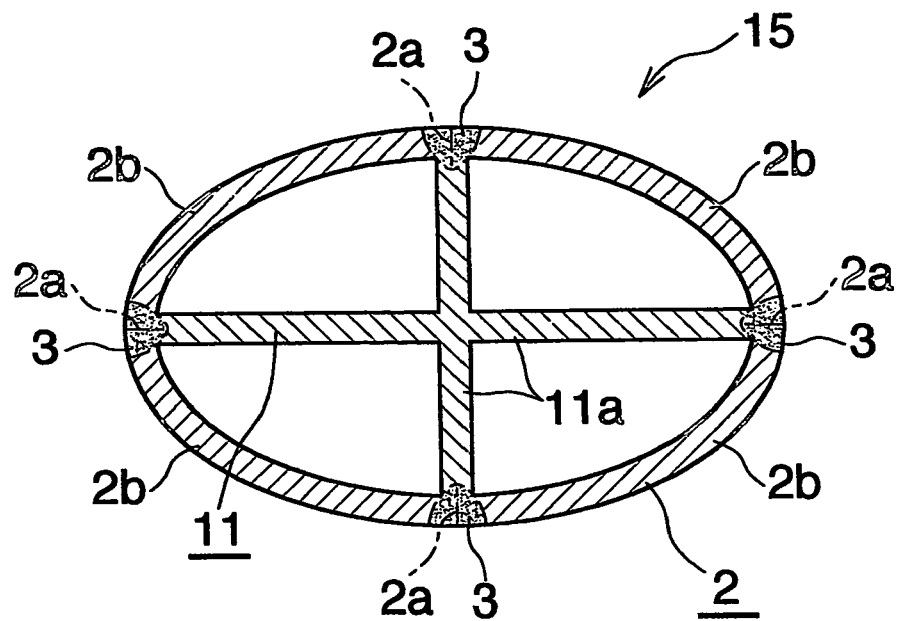
FIG. 7 is a cross sectional view showing a tubular metal body according to Embodiment 3 of the invention.

FIG. 7 shows this embodiment.

With reference to FIG. 7, the embodiment, i.e., a tubular metal body 15, comprises a porthole die-extruded tube 2 which is elliptical in cross section. The metal body 15 has the same structure as the metal body 10 of Embodiment 2 with the exception of the above feature and is produced by the same method as the metal body 10 of Embodiment 2.

Embodiment 4

Figure 8:
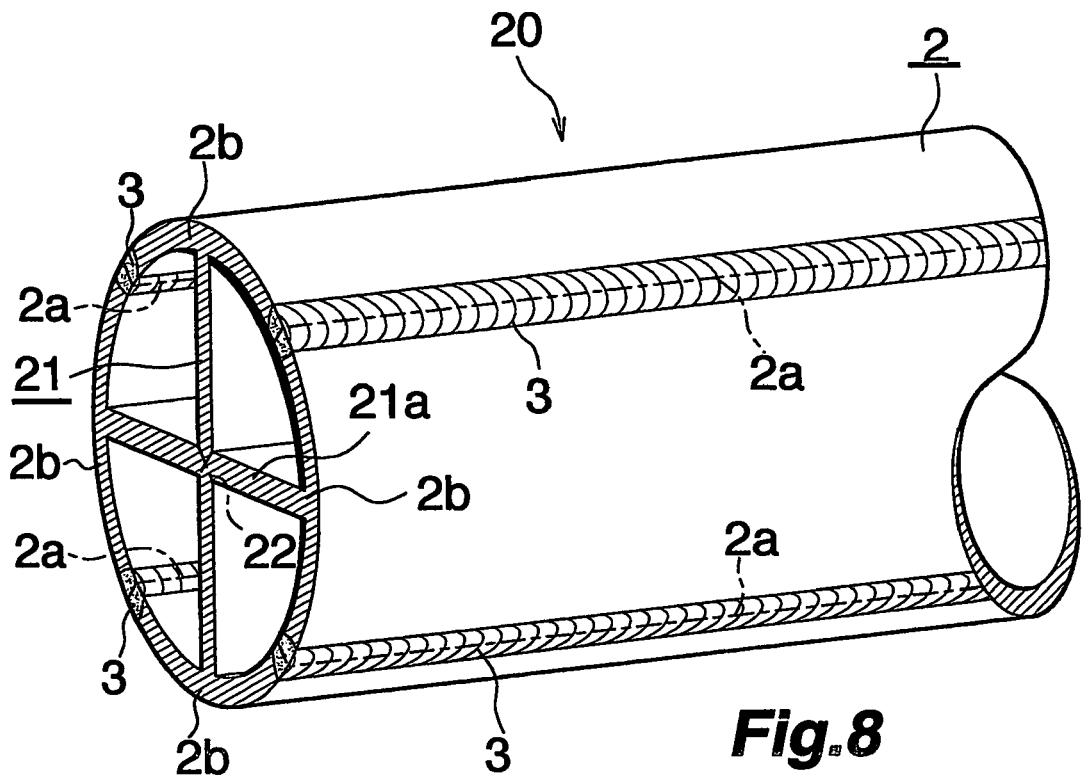
FIG. 8 is a fragmentary perspective view showing a tubular metal body according to Embodiment 4 of the invention.

This embodiment is shown in FIG. 8.

FIG. 8 shows a tubular metal body 20 according to this embodiment. The body 20 comprises a porthole die-extruded tube 2 which is provided inside thereof with a reinforcing partition 21 extending over the entire length of the tube 2 and formed integrally therewith so as to divide the interior of the tube 2 into a plurality of spaces. The reinforcing partition 21 is in the form of a cross in cross section and comprises a plurality of partition walls 21a integral with respective components 2b of the tube 2, extending toward the center line of the tube 2 and joined on the center line. The partition 21 is extruded integrally with the tube 2, and the partition walls 21a are integral with the respective components 2b and joined to one another on the center line of the tube 2. This joint portion is indicated at 22.

The metal body 20 has the same structure as the tubular metal body 1 of Embodiment 1 with the exception of the above feature, and is produced by the same method as the metal body 1 of Embodiment 1.

The tubular metal bodies 1, 10, 15 and 20 of Embodiments 1 to 4 are useful for fuel cell systems comprising a pressure vessel for fuel hydrogen gas, a fuel cell and pressure piping for transporting the fuel hydrogen gas from the pressure vessel to the fuel cell, for use in the pressure piping. Such a fuel cell system is installed in fuel cell motor vehicles or used in cogeneration systems.

The tubular metal bodies 1, 10, 15 and 20 are useful for cogeneration systems comprising a natural gas supply system, power generator and power generator drive apparatus, the gas supply system comprising a natural gas pressure vessel and pressure piping for delivering natural gas from the vessel, for use in the pressure piping for transporting natural gas from the pressure vessel to the power generator drive apparatus.

The tubular metal bodies 1, 10, 15 and 20 are useful for natural gas motor vehicles comprising a natural gas supply system and an engine for use with natural gas as a fuel, the gas supply system comprising a natural gas pressure vessel and pressure piping for delivering natural gas from the vessel, for use in the pressure piping for transporting natural gas from the pressure vessel to the engine.

The tubular metal bodies 1, 10, 15 and 20 are useful for oxygen gas supply system comprising an oxygen gas pressure vessel and pressure piping for delivering oxygen gas from the pressure vessel, for use in the pressure piping.

However, the tubular metal bodies of the invention are not limited to use in such pressure piping systems.

Embodiment 5

Figure 9:
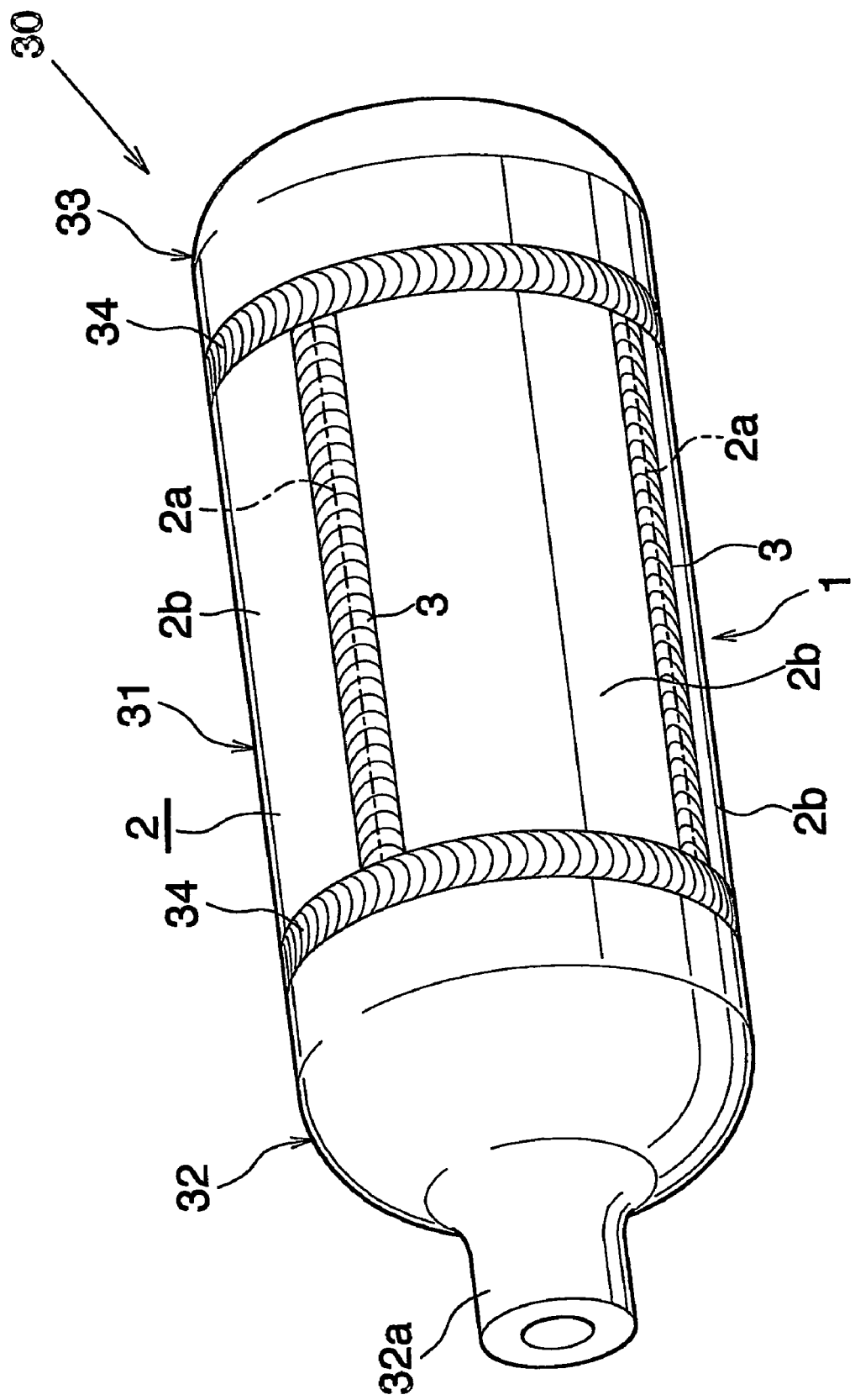
FIG. 9 is a perspective view showing a pressure vessel liner according to Embodiment 5 of the invention.
Figure 10:
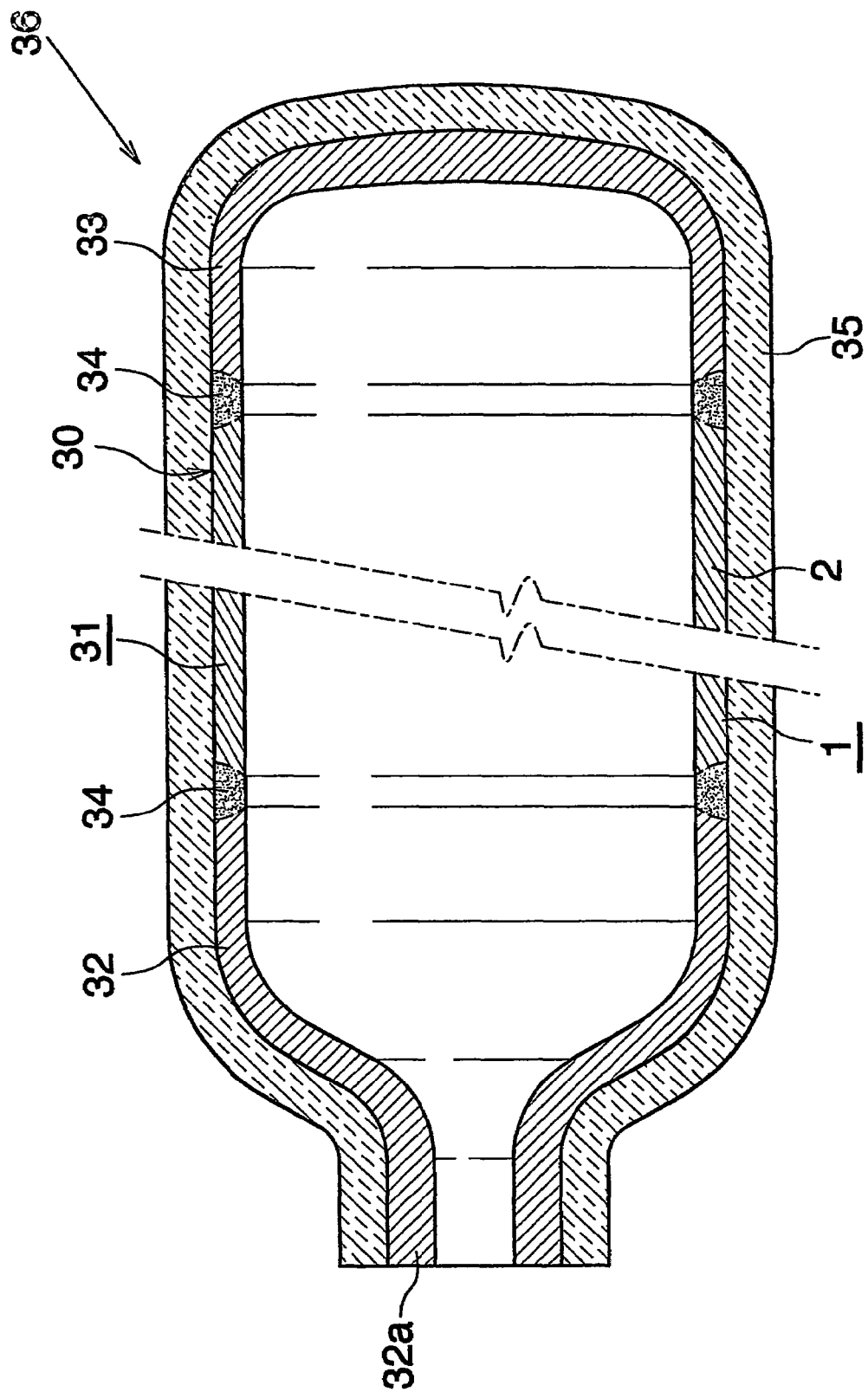
FIG. 10 is a view in longitudinal section of a high pressure vessel wherein the liner of Embodiment 5 is used.
Figure 11:
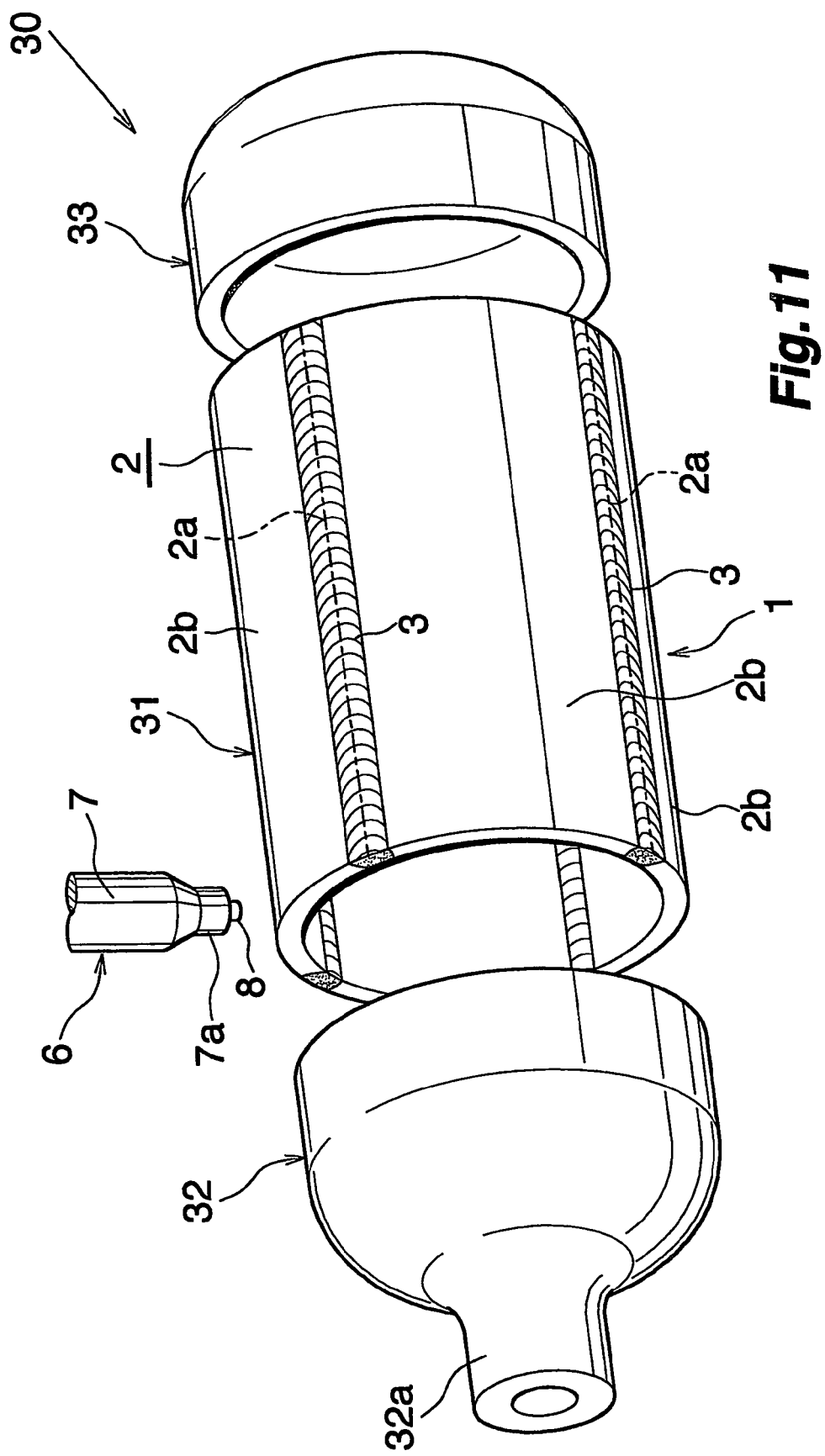
FIG. 11 is a perspective view showing a method of producing the pressure vessel liner of Embodiment 5.

This embodiment is shown in FIGS. 9 to 11.

FIG. 9 shows a liner of this embodiment for use in pressure vessels, and FIG. 10 shows a high-pressure hydrogen tank wherein the liner is used. FIG. 11 shows a method of producing the pressure vessel liner.

With reference to FIG. 9, the pressure vessel liner 30 comprises a hollow cylindrical trunk 31 having an opening at each of opposite ends thereof, and aluminum head plates 32, 33 joined to the respective ends of the trunk 31 and closing the end openings.

The trunk 31 is in the form of the tubular metal body 1 of Embodiment 1 and comprises a porthole die-extruded tube 2 wherein the base material of the tube in all the joint portions 2a and in the vicinity thereof is modified.

The two head plates 32, 33 are made by cutting or forging. One of the head plates, 32, is integrally provided with a mouthpiece mount portion 32a. The two head plates 32, 33 are each made, for example, from one of JIS A2000 alloy, JIS A5000 alloy, JIS A6000 alloy and JIS A7000 alloy.

The tube 2 providing the trunk 31 and the two head plates 32, 33 may all be made from the same material, or at least two of them may be made from different materials.

The trunk 31 is metallically joined to the head plates 32, 33 by a suitable method. According to the present embodiment, the trunk 31 and the head plates 32, 33 are joined at the butted portions by friction agitation over the entire circumference thereof. The beads of the resulting joints are indicated at 34.

With reference to FIG. 10, the liner 30 is covered with a fiber-reinforced resin layer 35, for example, of a resin reinforced with carbon fibers over the entire periphery thereof except for the mouthpiece mount portion 32a, for use as a high-pressure vessel 36.

The liner 30 for use in pressure vessels is produced by the method to be described below with reference to FIG. 11.

First, a trunk 31 is made from a porthole die-extruded tube 2 by the method described with reference to Embodiment 1, i.e., by the friction agitation mixing of the base material thereof in all joint portions 2a and in the vicinity thereof to modify and produce finely divided crystal grains. The trunk 31 is the same as the tubular metal body 1 of Embodiment 1.

On the other hand, a head plate 32 having a mouthpiece mount portion 32a and a head plate 33 having no mount portion are made by forging or cutting.

The large end of the head plate 32 is then butted against one end of the trunk 31. These ends are flat-surfaced, and are butted against each other in face-to-face contact. The trunk 31 and the head plate 32 are equal in wall thickness at the butted portion. Subsequently, a friction agitation joining tool 6 in rotation has its probe 8 placed into the butted portion of the trunk 31 and the head plate 32 at one part of the circumference thereof. The rotor 7 and probe 8 of the tool 6 are made of a material harder than the trunk 31 and the head plates 32, 33 and having heat resistance to withstand the frictional heat to be generated during joining.

At this time, the shoulder of the small-diameter portion 7a of the tool 6 around the probe 8 is pressed against the trunk 31 and the head plate 32. The shoulder in pressing contact with the work produces a satisfactory joint by preventing the soft metal portion from scattering at the start of and during the joining, further generating frictional heat by the sliding movement of the shoulder on the trunk 31 and the head plate 32 to soften the portions of the trunk 31 and the head plate 32 in contact with the probe 8 and the vicinity thereof to a greater extent while preventing formation of flashes or like irregularities on the surface of the joint.

The trunk 31 and the head plate 32 are then moved relative to the friction agitation joining tool 6 to thereby move the probe 8 circumferentially of the butted portion. The frictional heat generated by the rotation of the probe 8 and the frictional heat generated by the sliding movement of the trunk 31 and the plate 32 relative to the shoulder soften the base material metal of the trunk 31 and the head plate 32 in the vicinity of the butted portion, and the softened portion is agitated and mixed by being subjected to the rotational force of the probe 8, further plastically flows to fill up a groove left by the passage of the probe 8 and thereafter rapidly loses the frictional heat to solidify on cooling. These phenomena are repeated with the movement of the probe 8 to thereby join the trunk 31 to the head plate 32. The probe 8 returns to the position where the probe is placed in first after moving along the entire circumference of the butted portion, whereby the truck 31 is joined to the head plate 32 over the entire circumference. At this time, beads are produced.

After returning to the position where the probe 8 is first placed into the butted portion or after moving past this position, the probe 8 is moved to the location of a contact member disposed at the butted portion of the trunk 31 and the head plate 32, where the probe 8 is withdrawn. The other head plate 33 is also joined to the trunk 31 in the same manner as above. In this way, a liner 30 is produced for use in pressure vessels.

The high-pressure vessel 36 is produced with use of the liner 30 by covering the liner 30 with a fiber-reinforced resin layer 35 over the entire periphery thereof except at the mouthpiece mount portion 32a.

Embodiment 6

Figure 12:
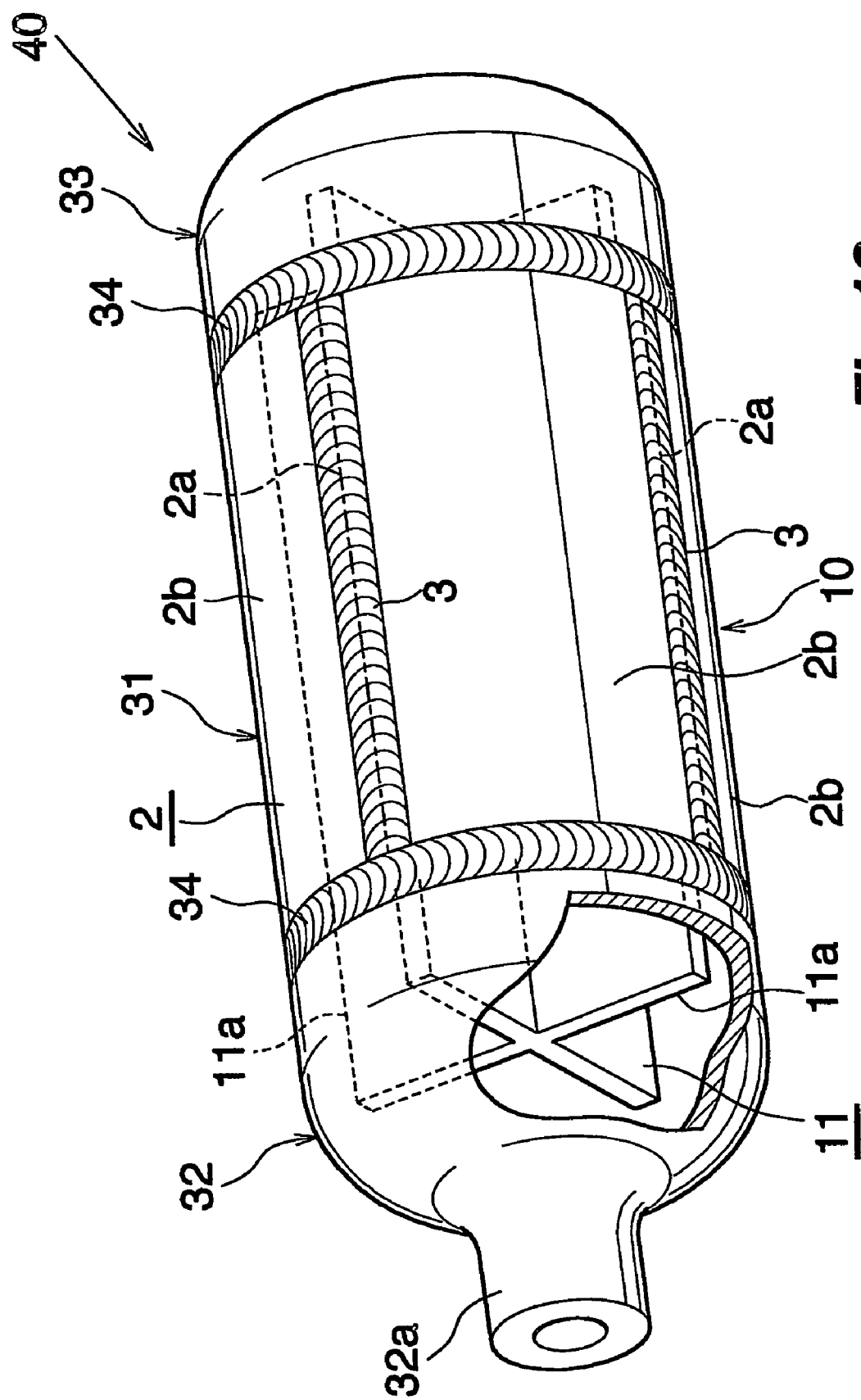
FIG. 12 is a perspective view partly broken away and showing a pressure vessel liner according to Embodiment 6 of the invention.
Figure 13:
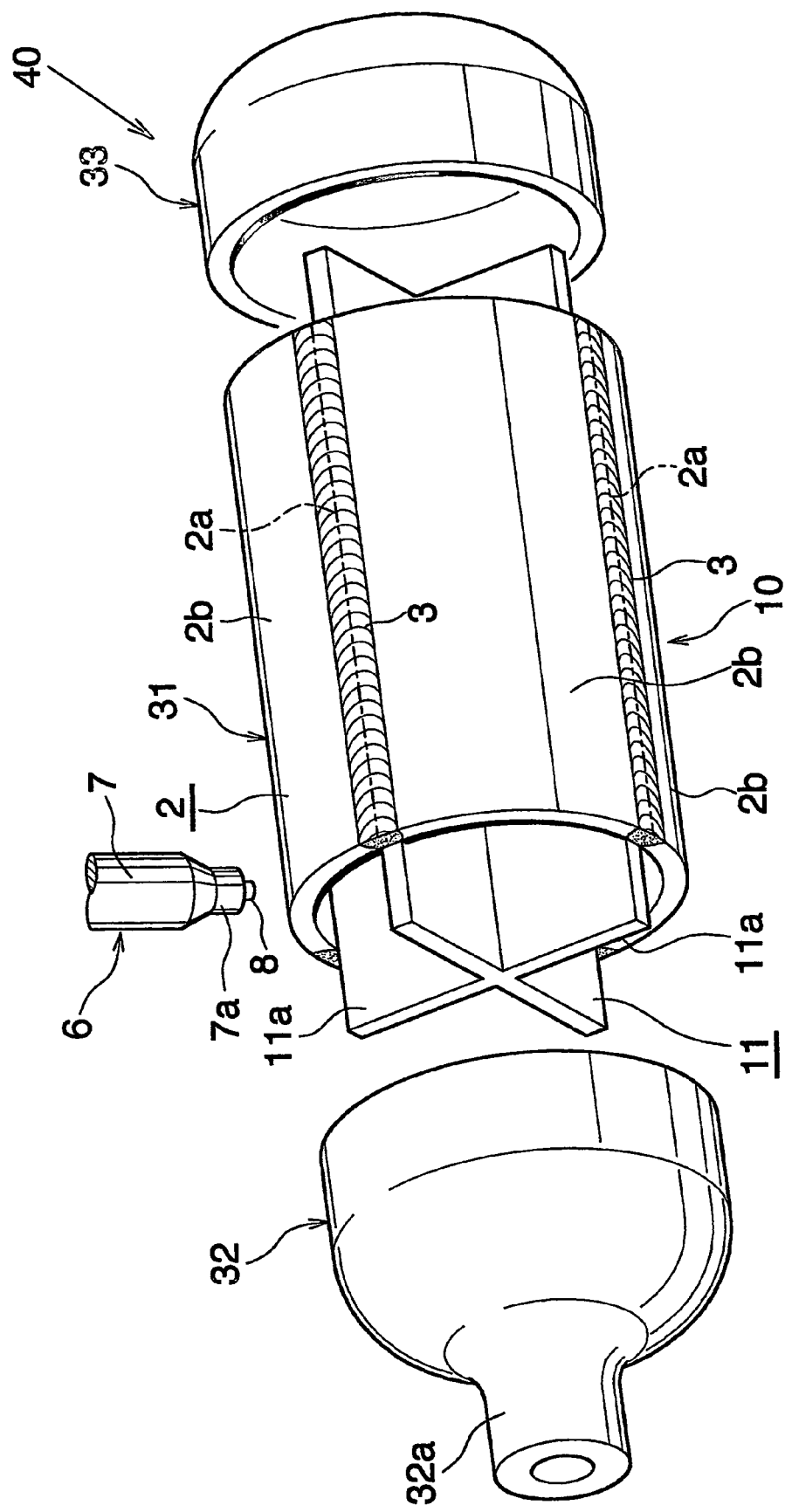
FIG. 13 is a perspective view showing a method of producing the pressure vessel liner of Embodiment 6.

This embodiment is shown in FIGS. 12 and 13.

FIG. 12 shows a liner 40 of this embodiment, wherein a trunk 31 has a reinforcing partition 11 fixedly provided inside thereof so as to divide the interior of the trunk 31 into a plurality of spaces. The partition 11 has a greater length than the trunk 31, and opposite ends of the partition 11 project outward beyond opposite ends of the trunk 31. Two head plates 32, 33 are fitted around the respective projecting ends of the partition 11 and joined to the trunk 31. The liner 40 has the same structure as the liner 30 of Embodiment 5 with the exception of the above feature.

Stated more specifically, the trunk 31 and the reinforcing partition 11 are made by giving a greater length to the partition 11 in the tubular metal body 10 of Embodiment 2 than to the porthole die-extruded tube 2 thereof and causing opposite ends of the partition 11 to project outward beyond the respective ends of the extruded tube 2.

The pressure vessel liner 40 is produced by the method to be described below with reference to FIG. 13.

A trunk 31 is formed and a reinforcing partition 11 is joined to the trunk 31 by friction agitation at the same time in the same manner as in the method of producing the tubular metal body 10 of Embodiment 2 with the exception of giving a greater length to the reinforcing partition 11 than to the porthole die-extruded tube 2 and inserting the partition 11 through the tube 2 so as to cause opposite ends of the partition 11 to project outward beyond the respective ends of the tube 2.

On the other hand, a head plate 32 having a mouthpiece mount portion 32a and a head plate 33 having no mount portion are made by forging or cutting.

Subsequently, the head plates 32, 33 are fitted around the respective projecting ends of the partition 11 and butted against the ends of the trunk 31. The two head plates 32, 33 are thereafter joined by friction agitation to the trunk 31 in the same manner as is the case with Embodiment 5. Since the trunk 31 and the head plates 32, 33 are supported from inside by the reinforcing partition 11 during joining, the trunk 31 and the head plates 32, 33 are prevented from deforming inward.

According to the present embodiment, the trunk 31 and the reinforcing partition 11 may be produced in the following manner. The partition 11 to be inserted into a die-extruded tube 2 is made to have the same length as the tube 2. The joint portions 2a of the tube 2 are modified and the partition 11 is joined to the tube 2 at the same time in the same manner as above, and opposite end portions of specified length are thereafter cut off from the tube 2, whereby the trunk 31 and the partition 11 are produced.

Embodiment 7

Figure 14:
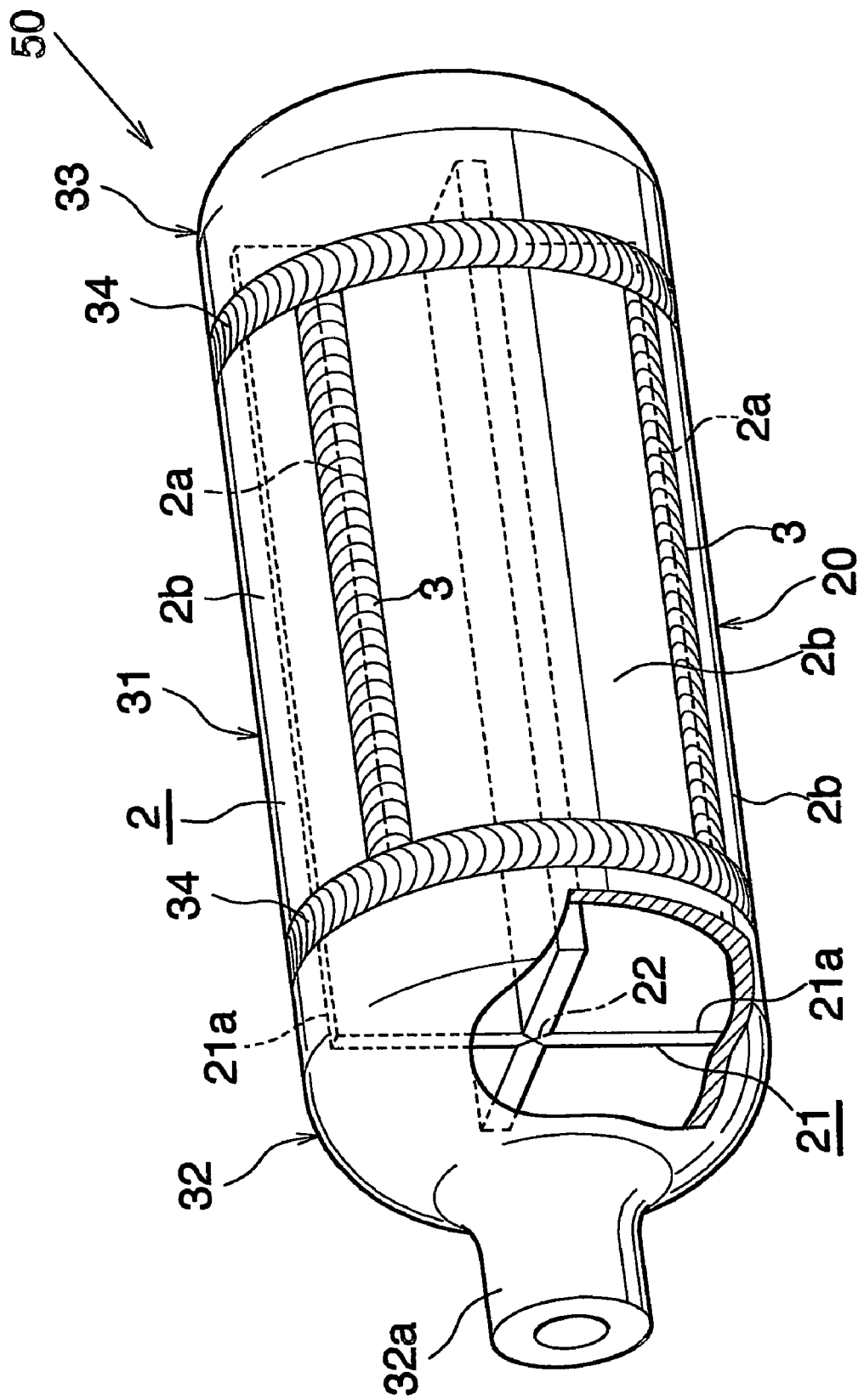
FIG. 14 is a perspective view partly broken away and showing a pressure vessel liner according to Embodiment 7 of the invention.
Figure 15:
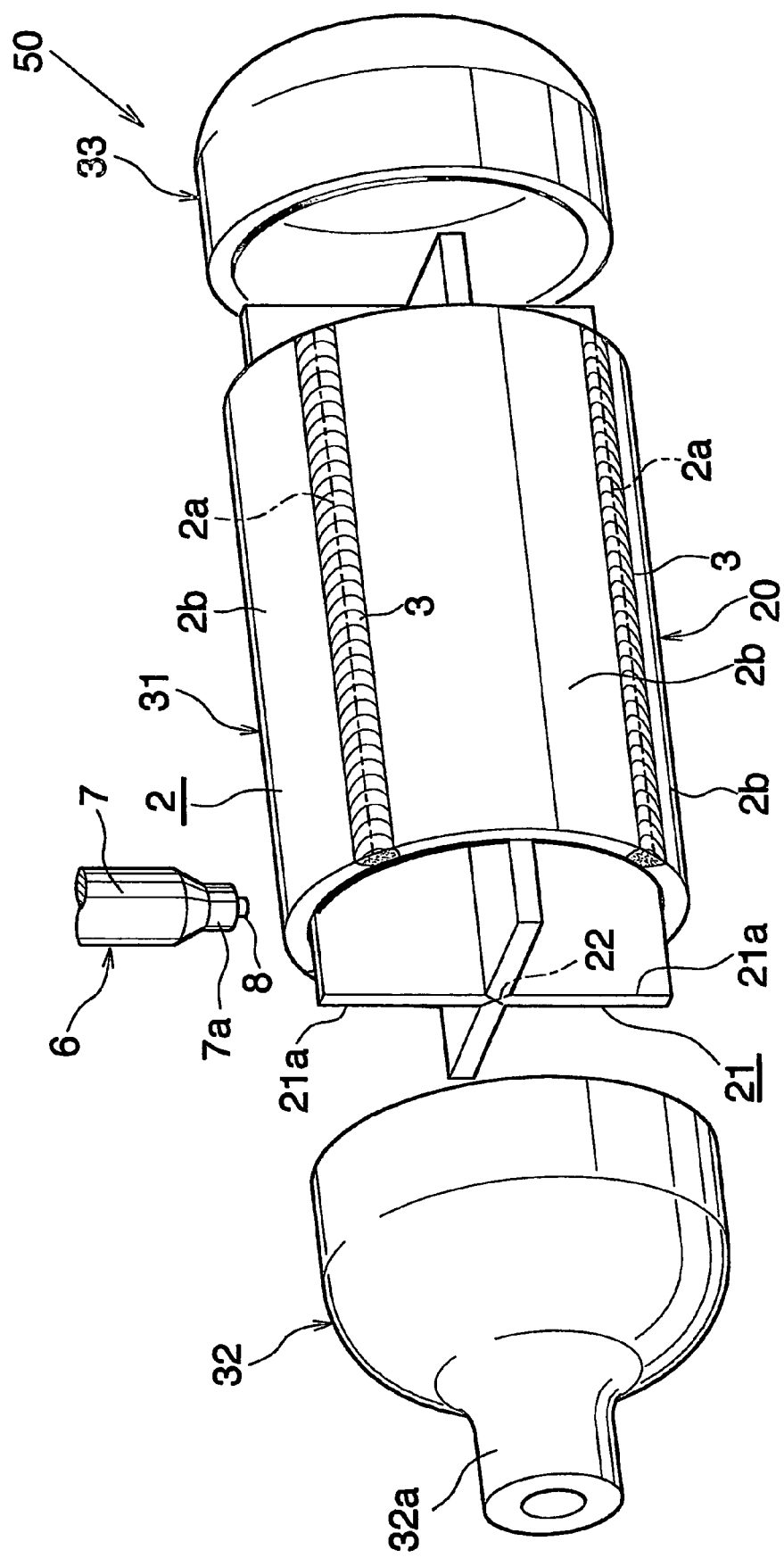
FIG. 15 is a perspective view showing a method of producing the pressure vessel liner of Embodiment 7.

This embodiment is shown in FIGS. 14 and 15.

FIG. 14 shows a pressure vessel liner 50 of this embodiment, wherein a trunk 31 has a reinforcing partition 11 provided inside thereof integrally therewith so as to divide the interior of the trunk 31 into a plurality of spaces. The partition 11 has a greater length than the trunk 31, and opposite ends of the partition 11 project outward beyond opposite ends of the trunk 31. Two head plates 32, 33 are fitted around the respective projecting ends of the partition 11 and joined to the trunk 31. The liner 50 has the same structure as the liner 30 of Embodiment 5 with the exception of the above feature.

Stated more specifically, the trunk 31 and the reinforcing partition 11 are made from the porthole die-extruded tube 2 of the tubular metal body 20 of Embodiment 4, by cutting off the opposite end portions of the tube 2 over a specified length.

The pressure vessel liner 50 is produced by making a trunk 31 and a reinforcing partition 21 in the same manner as in the method of producing the tubular metal body 20 of Embodiment 4, thereafter cutting off the opposite end portions of the die-extruded tube 2 over a specified length, and subsequently joining two head plates 32, 33 to opposite ends of the trunk 31 by friction agitation in the same manner as is the case with Embodiment 6 (see FIG. 15).

Embodiment 8

Figure 16:
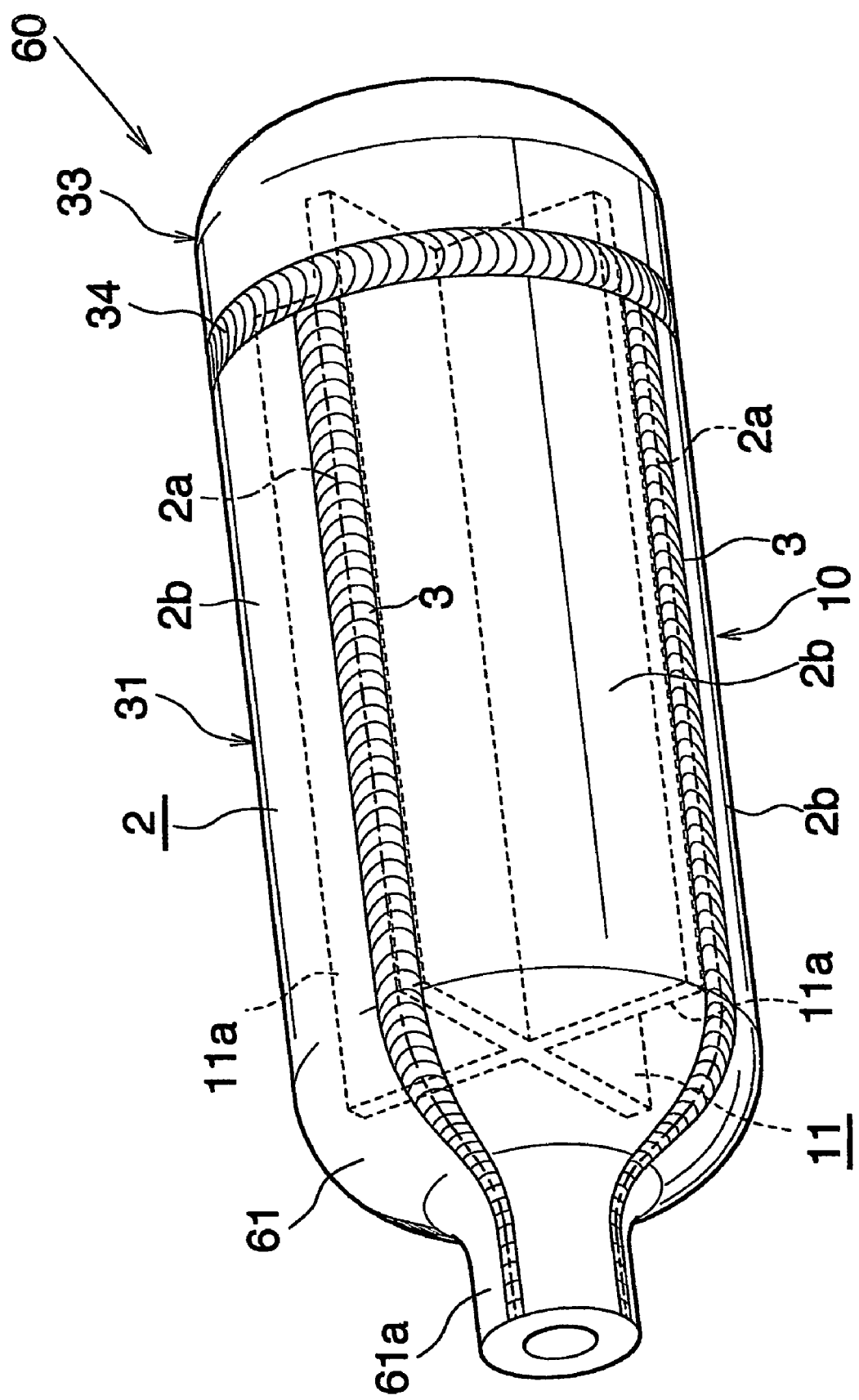
FIG. 16 is a perspective view showing a pressure vessel liner according to Embodiment 8 of the invention.
Figure 17:
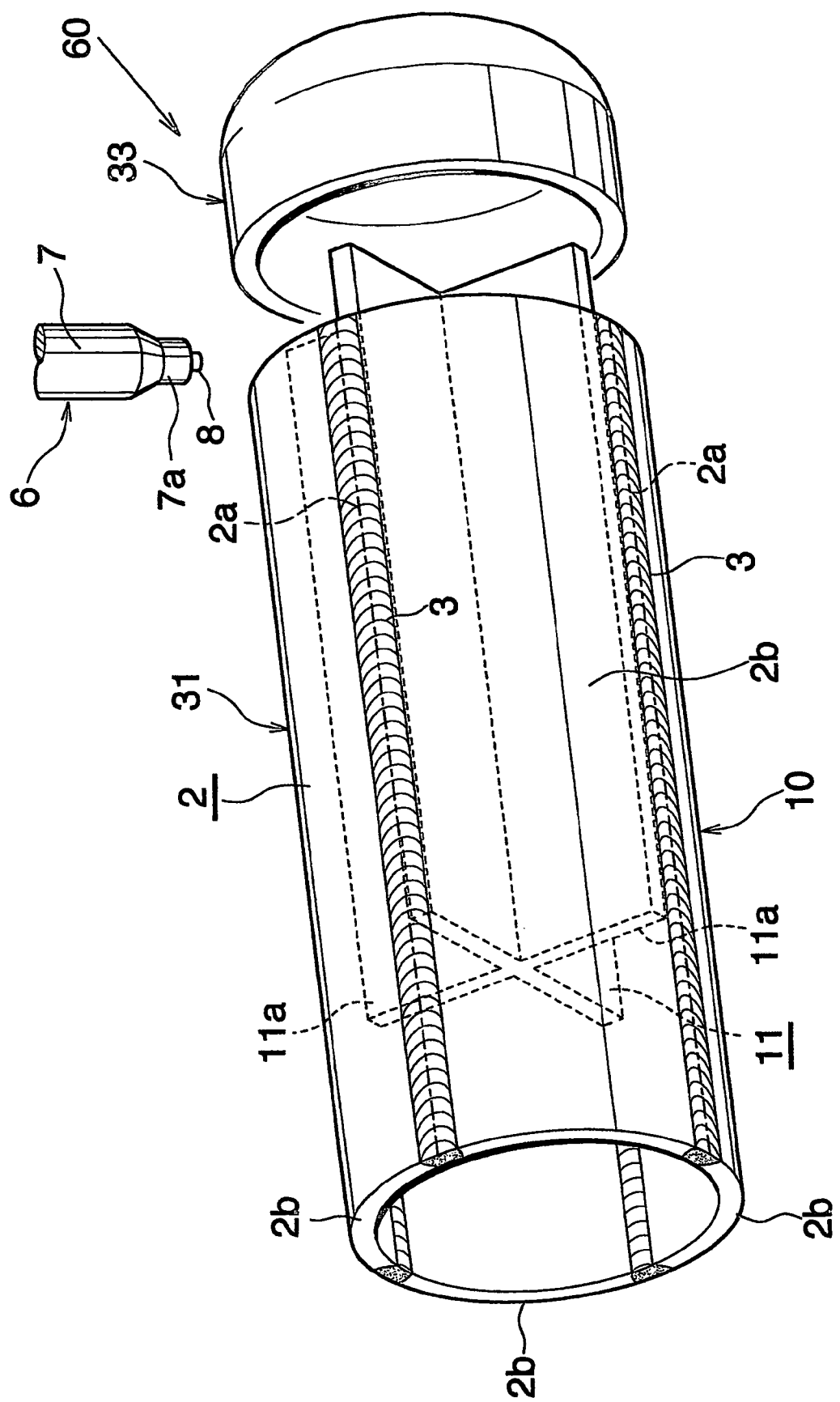
FIG. 17 is a perspective view showing a method of producing the pressure vessel liner of Embodiment 8.

This embodiment is shown in FIGS. 16 and 17.

FIG. 16 shows a pressure vessel liner 60 of this embodiment, wherein a trunk 31 has a head plate portion 61 formed integrally with one end thereof and having a mouthpiece mount portion 61a. One opening of the trunk 31 is closed with this head plate portion 61. No portion of a reinforcing partition 11 extends into the interior of the head plate portion 11. The liner 60 has the same structure as the liner 40 of Embodiment 6 with the exception of the above feature.

Stated more specifically, the trunk 31 and the reinforcing partition 11 are made by positioning one end of the reinforcing partition 11 of the tubular metal body 10 of Embodiment 2 inwardly of one end of the porthole die-extruded tube 2 thereof and causing the other end of the partition 11 to project outward beyond the other end of the tube 2.

The pressure vessel liner 60 is produced by the following method.

A trunk 31 is made, and a reinforcing partition 11 is joined to the trunk 21 by friction agitation at the same time, by the same method as Embodiment 6 with the exception of positioning one end of the partition 11 inwardly of one end of the porthole die-extruded tube 2 (see FIG. 17), and a head plate portion 61 having a mouthpiece mount portion 61a is thereafter formed by spinning, forging or pressing the projecting end of the trunk 31. A head plate 33 is subsequently joined to the other end of the trunk 31 in the same manner as in the case of Embodiment 6. In this way, a pressure vessel liner 60 is produced.

With the method described above, the joint portions 2a of the die-extruded tube 2 providing the trunk 31 are modified to finely divide the crystal grains of the base material metal, with the result that the joint portions 2a are improved in elongation, strength and like mechanical properties. Accordingly, the trunk 31 can be subjected to spinning or press work or forged without permitting cracks to develop in the joint portions 2a. Unless the joint portions 2a of the porthole die-extruded tube 2 are modified, spinning, forcing or press work is likely to cause the joint portions 2a to develop cracks.

Embodiment 9

Figure 18:
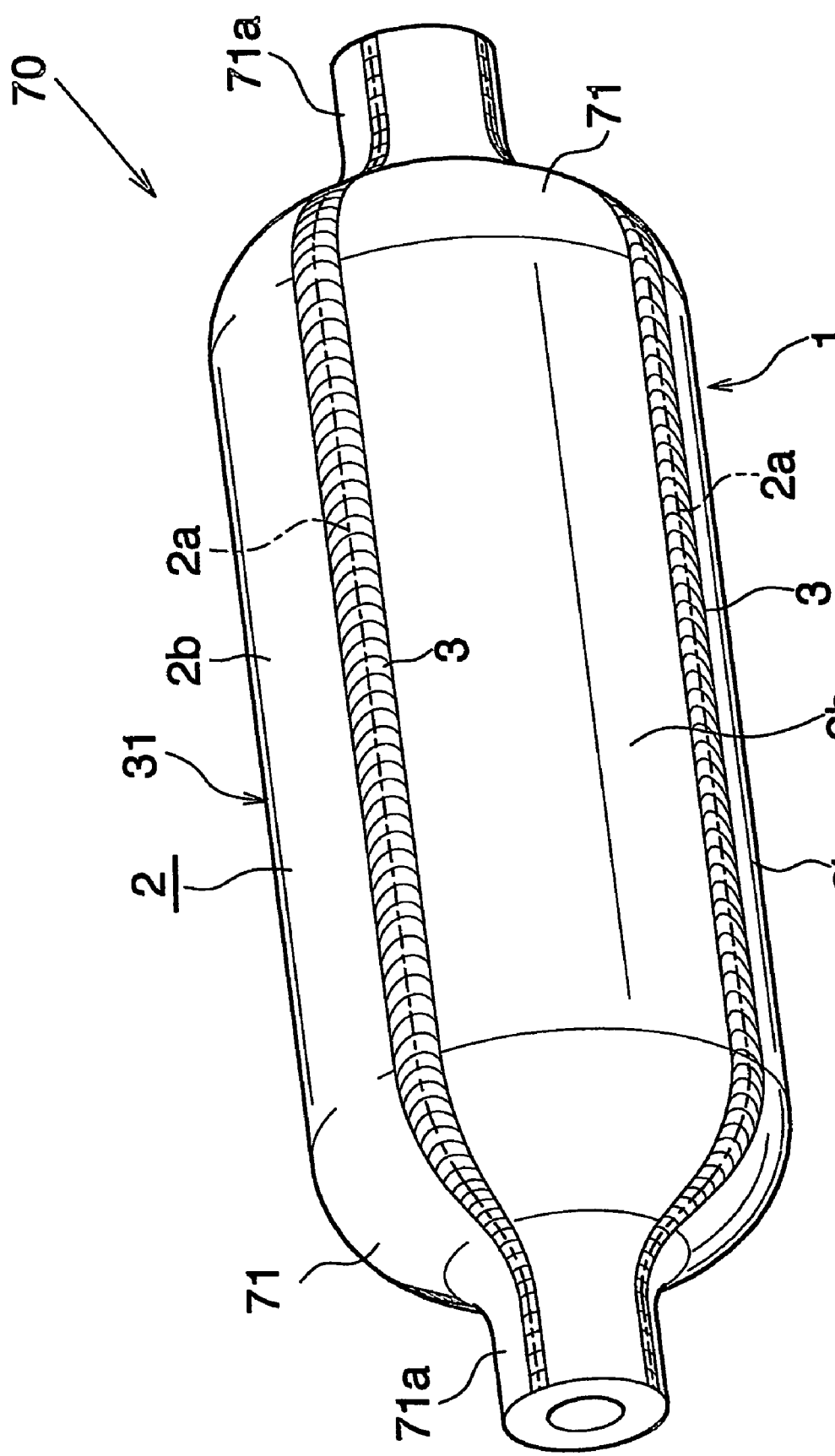
FIG. 18 is a perspective view showing a pressure vessel liner according to Embodiment 9 of the invention.

This embodiment is shown in FIG. 18.

FIG. 18 shows a pressure vessel liner 70 of this embodiment, wherein a trunk 31 has a head plate portion 71 integral with each of opposite ends thereof and having a mouthpiece mount portion 71a. The head plate portion 71 closes an opening at each end of the trunk 31. The liner 70 has the same structure as the line 30 of Embodiment 5 with the exception of the above feature.

Stated more specifically, s trunk 31 is made in the same manner as in the case of Embodiment 1, and opposite end portions of the trunk 31 are worked by spinning, forging or pressing to provide respective head plate portions 71 each having a mouthpiece mount portion 71a. In this way, a liner 70 is produced for use in pressure vessels.

In spinning the trunk 31 by this method, no cracks will develop in the joint portions 2a of the die-extruded tube 2 constituting the trunk 31 as is the case with Embodiment 8.

With Embodiments 5 to 9, the cross sectional shape of the die-extruded tube 2 is not limited to circular but may be in the form of an ellipse (not limited to a mathematically defined elliptical form but including forms which are nearly elliptical, e.g., oblong) or otherwise shaped.

As is the case with Embodiment 5, the liners 40, 50, 60, 70 of Embodiments 6 to 9 are each covered with a fiber-reinforced resin layer, for example, of a resin reinforced with carbon fibers over the entire periphery thereof except for the mouthpiece mount portion 32a, 61a or 71a for use as a high-pressure vessel.

The high-pressure vessel having any one of the liners 30, 40, 50, 60, 70 of the foregoing embodiments is used in fuel cell systems comprising a fuel hydrogen gas pressure vessel, a fuel cell and pressure piping for transporting fuel hydrogen gas from the pressure vessel to the fuel cell therethrough, as the hydrogen gas pressure vessel. The fuel cell system is installed in fuel cell motor vehicles. The fuel cell system is useful also for cogeneration systems.

Further the high-pressure vessel is used in natural gas supply systems comprising a natural gas pressure vessel, and pressure piping for delivering natural gas from the pressure vessel, as the natural gas pressure vessel. The natural gas supply system is used along with a power generator and a power generator drive apparatus in cogeneration systems. The natural gas supply system is used also in natural gas motor vehicles comprising an engine for use with natural gas as a fuel.

The high-pressure vessel is used also in oxygen gas supply systems comprising an oxygen gas pressure vessel, and pressure piping for delivering oxygen gas from the pressure vessel, as the oxygen gas pressure vessel.

INDUSTRIAL APPLICABILITY

The invention provides tubular metal bodies for use in high-pressure piping, for example, for motor vehicles, houses, transport machines, etc. for passing therethrough fuel hydrogen gas or natural gas of high pressure serving as a fuel for power generation. Such tubular metal bodies are used for providing trunks of liners for pressure vessels for storing hydrogen gas, natural gas or oxygen gas in motor vehicles, houses and transport machines.

The invention claimed is:

1. A method of producing a tubular metal body, comprising:
   preparing a tube extruded through a porthole die and comprising a plurality of components joined to one another with a plurality of joint portions extending over the entire length of the tube;
   placing a probe of a friction agitation joining tool from outside into each of the joint portions of the extruded tube so as to position the probe partly in the tube components on opposite sides of the joint portion; and
   moving the extruded tube and the probe relative to each other longitudinally of the tube to thereby frictionally agitate the base material metal of the extruded tube for a modifying treatment to produce finely divided crystal grains.

2. A method of producing a tubular metal body according to claim 1 wherein the extruded tube has a reinforcing partition placed therein and extending longitudinally of the tube so as to divide inside thereof into a plurality of spaces, and in frictionally agitating the base material metal of the extruded tube in each of the joint portions thereof, a forward end of the probe is placed into the partition through each of at least two of the joint portions to join the partition to the extruded tube by friction agitation.

3. A method of producing a tubular metal body according to claim 1 wherein the extruded tube has a reinforcing partition interconnecting at least two of the components thereof and extending longitudinally of the tube, the reinforcing partition being extruded integrally with the tube.

4. A method of producing a tubular metal body, comprising:
   preparing a tube extruded through a porthole die and comprising a plurality of components joined to one another with a plurality of joint portions extending over the entire length of the tube;
   placing a probe of a friction agitation joining tool from outside into each of the joint portions of the extruded tube immediately after extrusion so as to position the probe partly in the tube components on opposite sides of the joint portion; and
   moving the extruded tube and the probe relative to each other longitudinally of the tube to thereby frictionally agitate the base material metal of the extruded tube for a modifying treatment to produce finely divided crystal grains.

* * * * *